United States Patent [19]
Shimada et al.

[11] Patent Number: 5,271,366
[45] Date of Patent: Dec. 21, 1993

[54] FUEL INJECTION SYSTEM

[75] Inventors: Taizo Shimada, Yokohama; Masakazu Yokoyama, Tokyo; Hiroshi Ishii, Kawasaki; Kiyoharu Yamada, Sagamihara, all of Japan

[73] Assignees: Mitsubishi Jidosha K.K., Tokyo, Japan; Mitsubishi Jidosha Engineering K.K.

[21] Appl. No.: 768,616

[22] PCT Filed: Feb. 7, 1991

[86] PCT No.: PCT/JP91/00148
§ 371 Date: Oct. 4, 1991
§ 102(e) Date: Oct. 4, 1991

[87] PCT Pub. No.: WO91/12421
PCT Pub. Date: Aug. 22, 1991

[30] Foreign Application Priority Data

| Feb. 7, 1990 | [JP] | Japan | 2-027992 |
| Feb. 16, 1990 | [JP] | Japan | 2-014418 |
| Apr. 27, 1990 | [JP] | Japan | 2-045463 |
| Apr. 27, 1990 | [JP] | Japan | 2-045464 |
| Jun. 27, 1990 | [JP] | Japan | 2-169264 |
| Jun. 27, 1990 | [JP] | Japan | 2-169265 |
| Jun. 27, 1990 | [JP] | Japan | 2-169266 |
| Jul. 31, 1990 | [JP] | Japan | 2-204328 |

[51] Int. Cl.⁵ .................... F02B 3/00; F02M 37/04
[52] U.S. Cl. .................... 123/300; 123/496
[58] Field of Search ........... 123/451, 299, 300, 501, 123/502, 506, 467, 496

[56] References Cited

U.S. PATENT DOCUMENTS

| 1,657,373 | 1/1928 | Danielson | 123/451 |
| 2,000,555 | 5/1935 | Becker | 123/508 |
| 4,479,475 | 10/1984 | Babitzka | 123/451 |
| 4,583,509 | 4/1986 | Schecter | 123/451 |
| 4,630,588 | 12/1986 | Sagawa | 123/506 |
| 4,838,232 | 6/1989 | Wich | 123/300 |
| 5,094,216 | 3/1992 | Miyaki | 123/506 |
| 5,115,783 | 5/1992 | Nakamura | 123/496 |

*Primary Examiner*—Carl S. Miller

[57] ABSTRACT

A fuel injection system has a fuel injection pump (1) having a plunger (1A) disposed in a pressure chamber (1D) and actuatable by a cam (2), and a solenoid-operated valve (6) connected to an injection pipe (4) communicating between the fuel injection pump (1) and a fuel injection nozzle (3), the solenoid-operated valve (6) being disposed near the fuel injection nozzle (3). A controller (C) has an injection advance map and an injection period map both depending on the rotational speed (9) of an engine and the load (10) on the engine. The controller (C) opens and closes the solenoid-operated valve (6) for controlling the supply of fuel from the fuel injection pump (1) to the fuel injection nozzle (3). Since the solenoid-operated valve (6) is disposed near the fuel injection nozzle (3), the fuel can well be cut off when the injection of the fuel is finished, thus reducing HC in exhaust gases and improving fuel economy. The timing to open and close the solenoid-operated valve (6) is controlled by the controller (C) to inject the fuel in an optimum pattern for lowering noise and NOx in the exhaust gases.

29 Claims, 32 Drawing Sheets

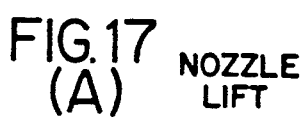
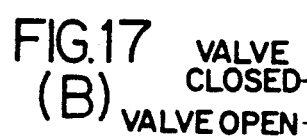
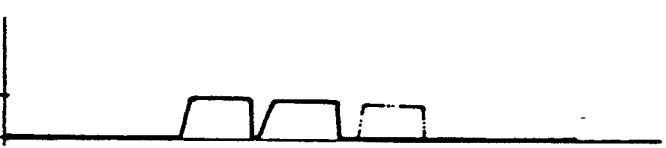
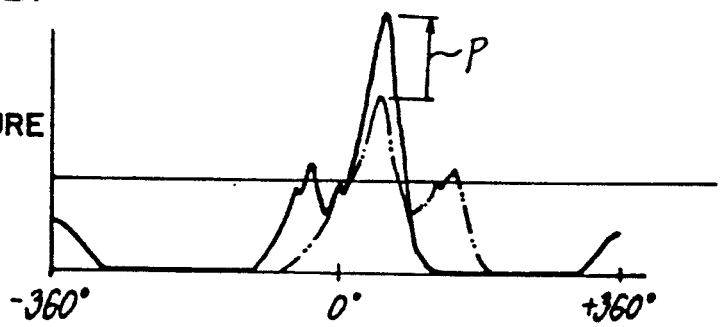

F I G. 18
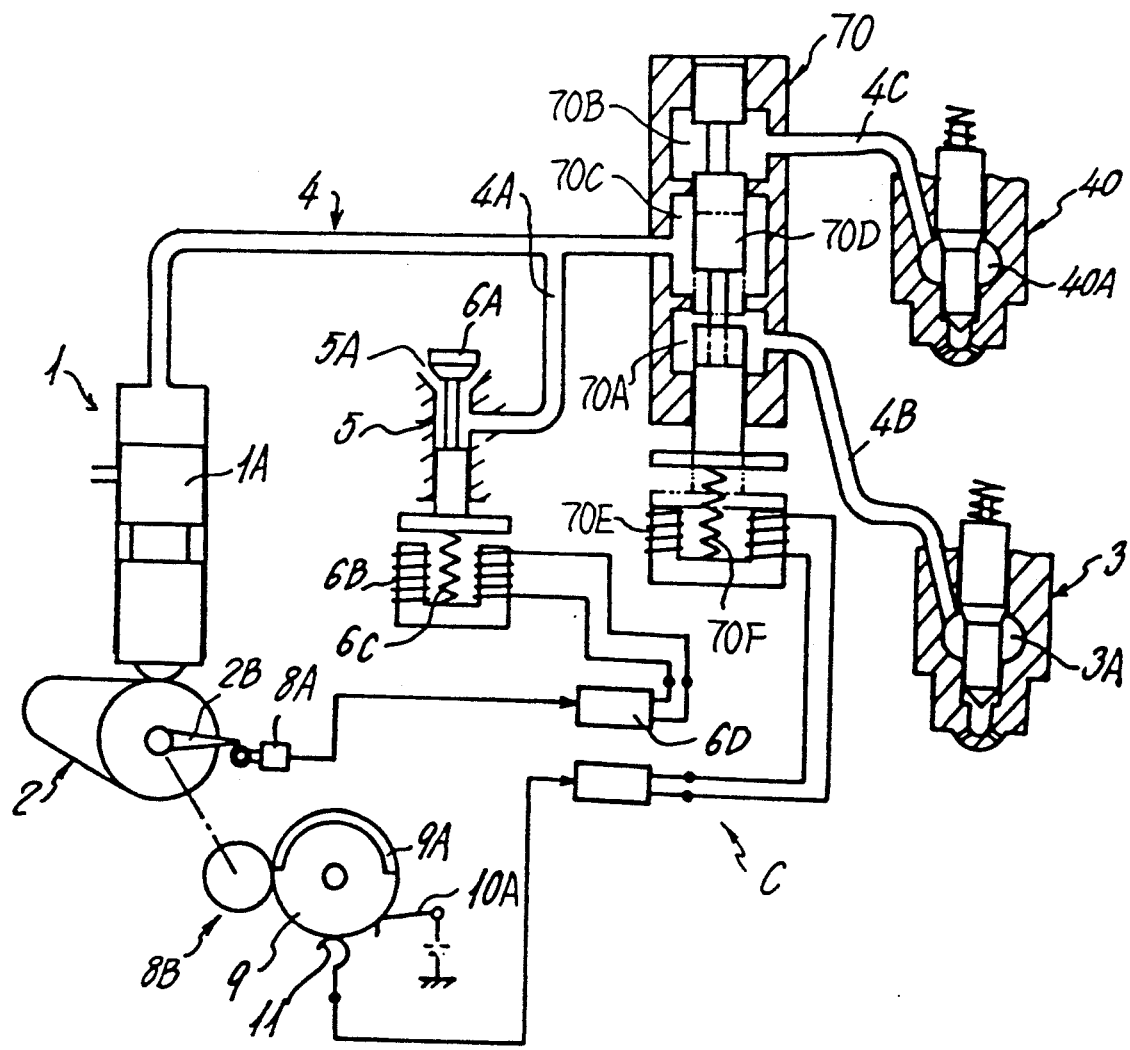

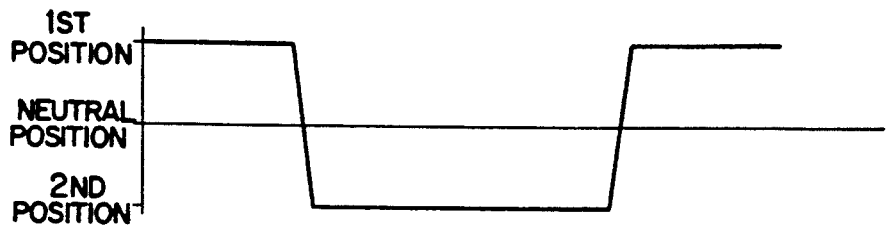
FIG.19(A)
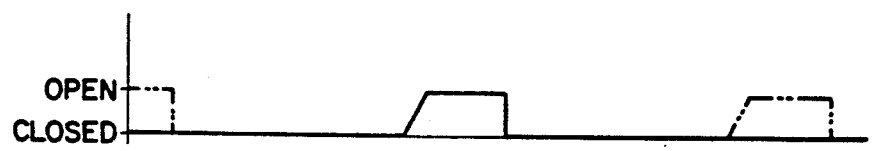
FIG.19(B)
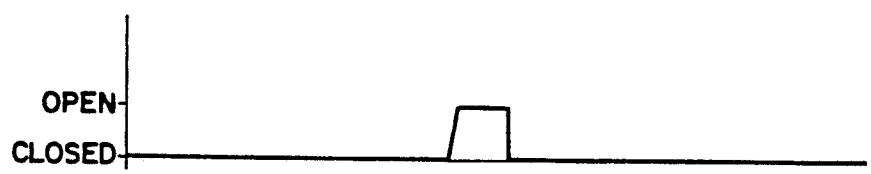
FIG.19(C)
FIG.19(D)
FIG.19(E)
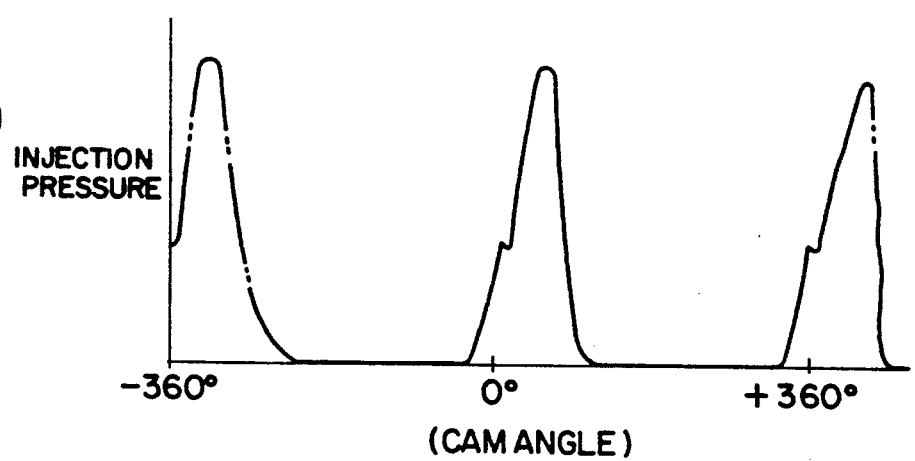

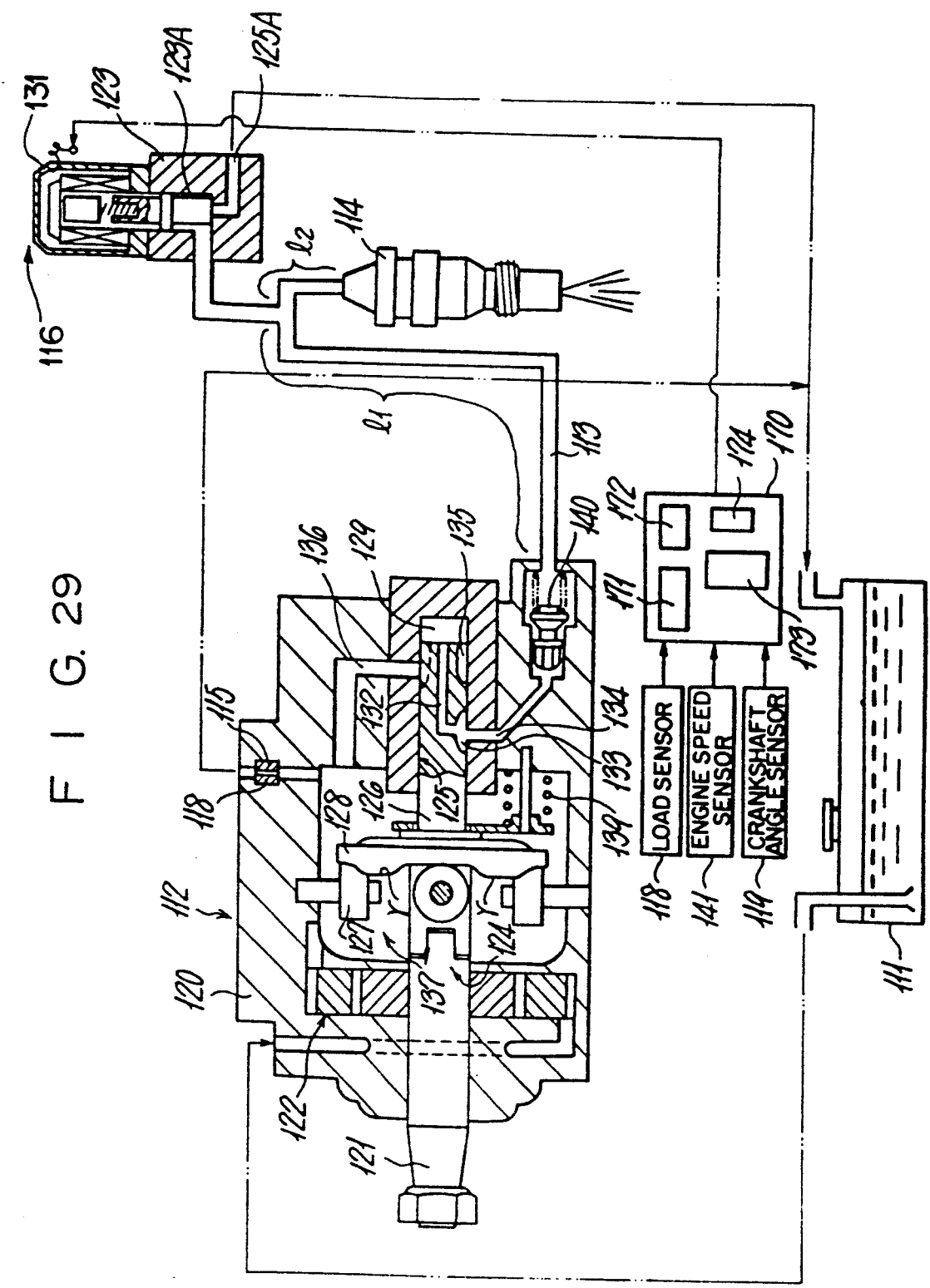

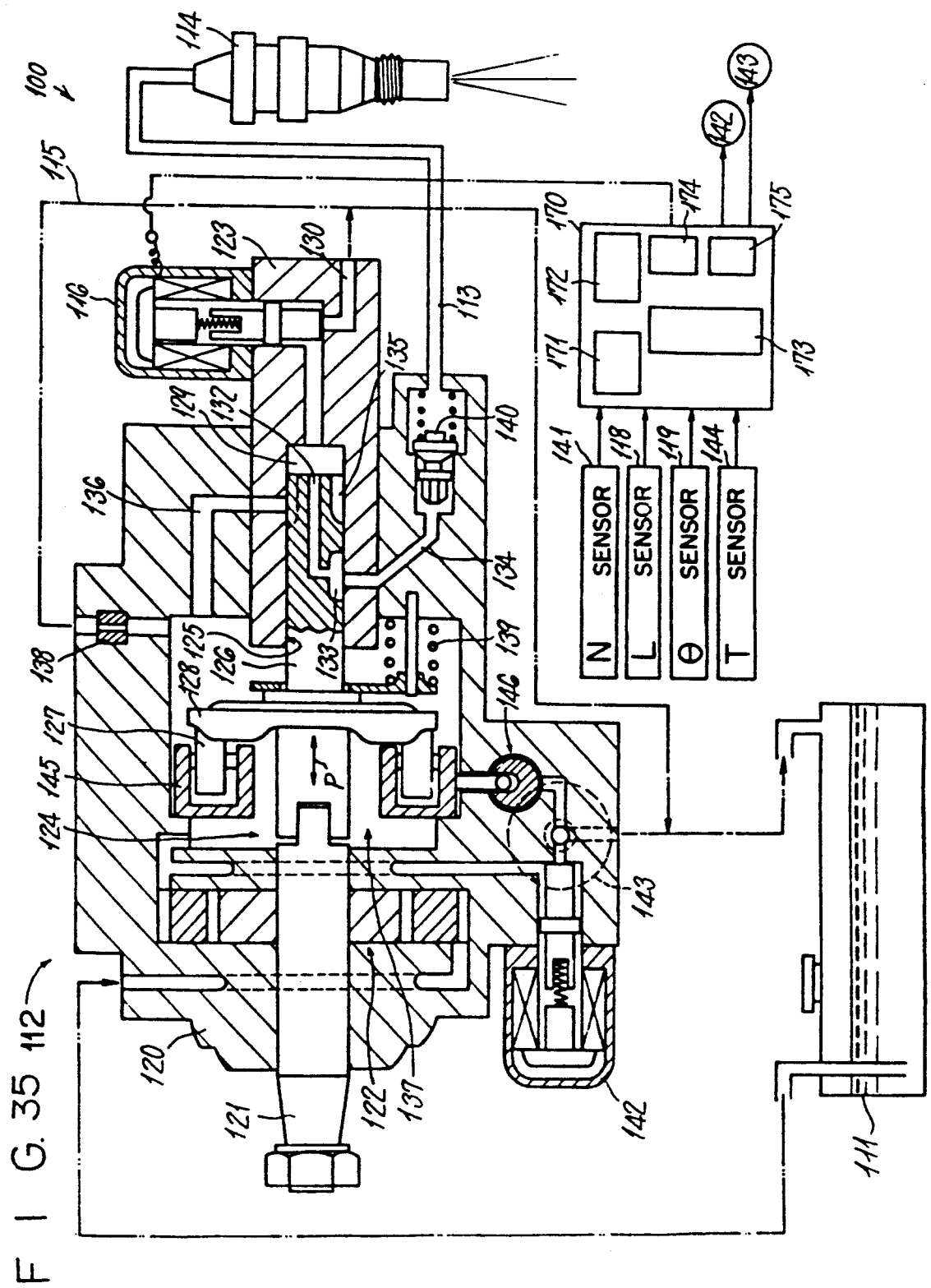

F I G. 36
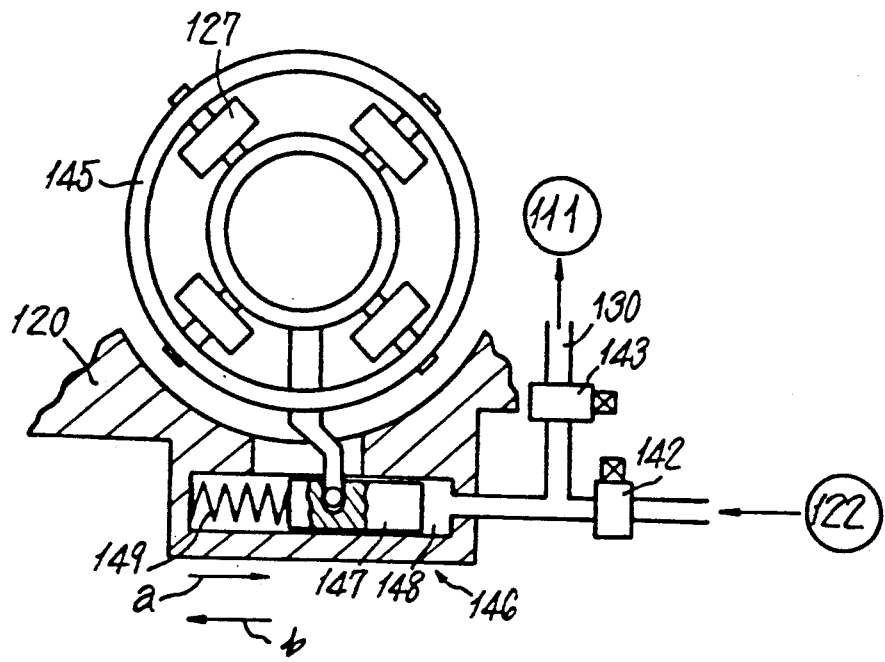
F I G. 37
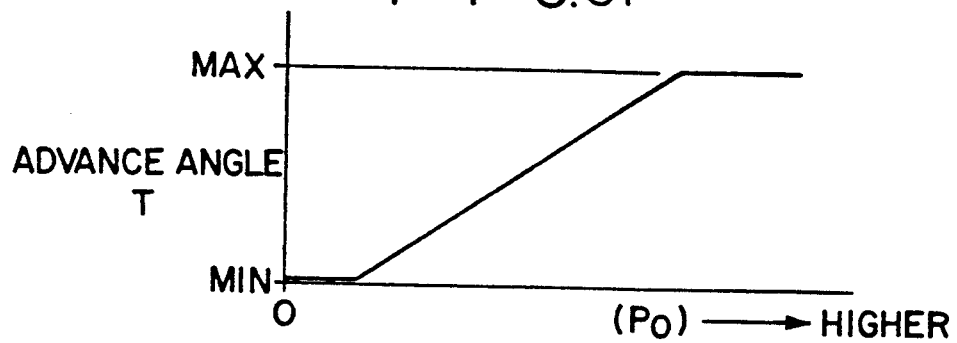
F I G. 38
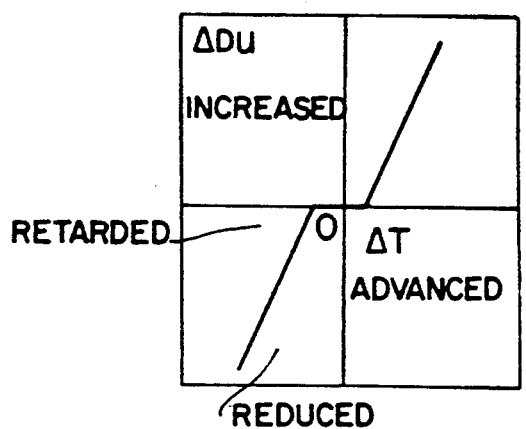

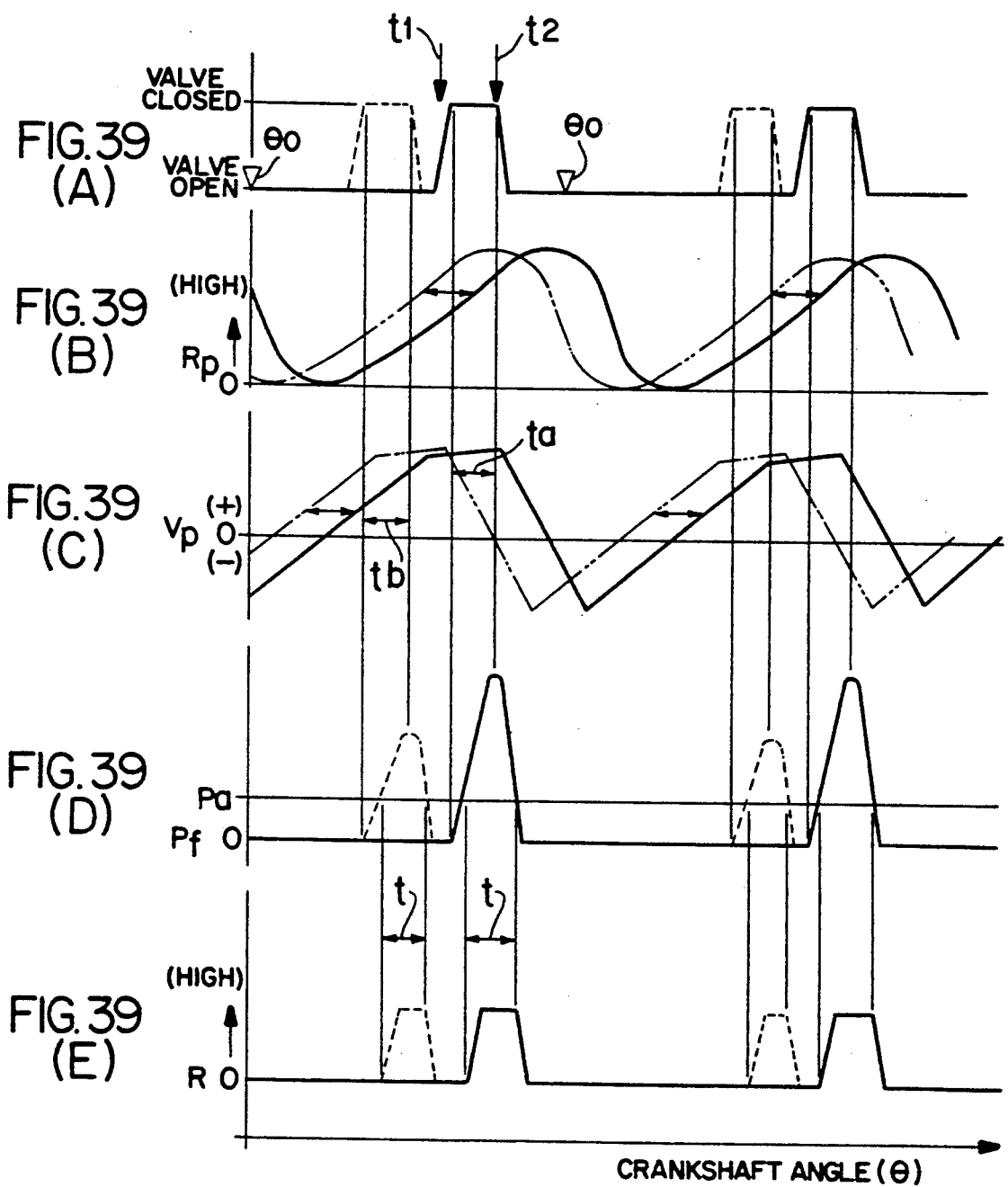

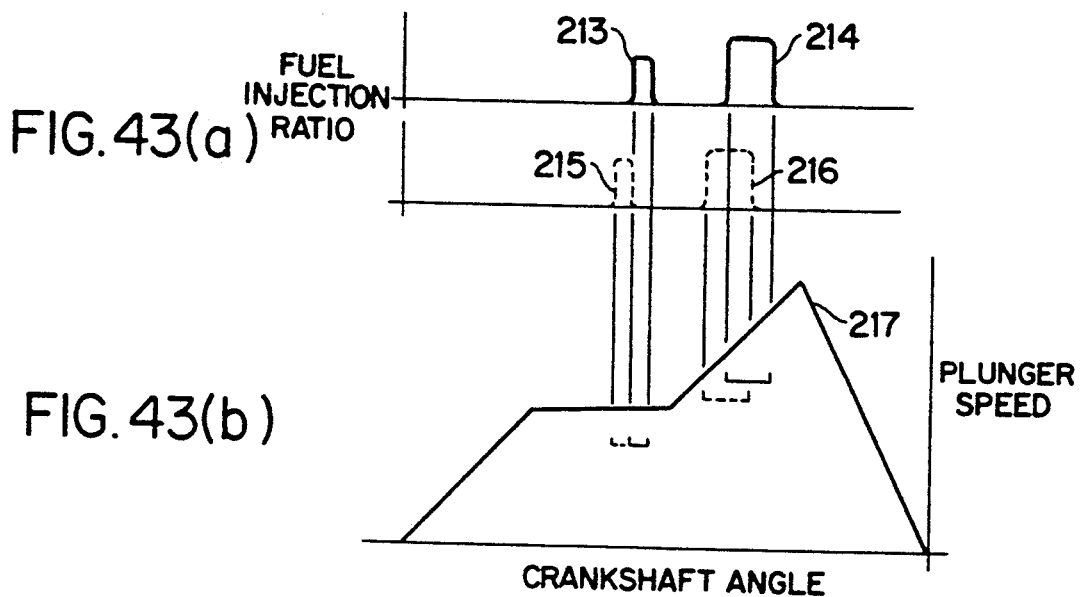
FIG. 43(a)
FIG. 43(b)
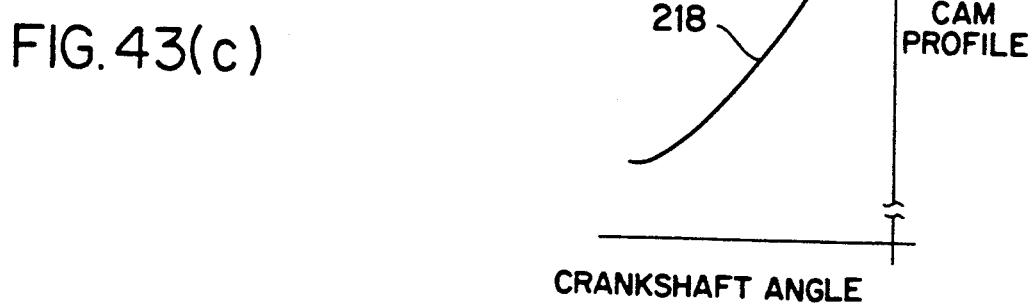
FIG. 43(c)

FUEL INJECTION SYSTEM

TECHNICAL FIELD

The present invention relates to a system for injecting fuel under pressure from a fuel injection pump into a combustion chamber in an internal combustion engine, and more particularly to a fuel injection system for pressurizing fuel with an in-line fuel injection pump or a distributor fuel injection pump for a diesel engine.

BACKGROUND ART

As is well known in the art, an in-line fuel injection pump for use in a diesel engine has a structure for feeding fuel under pressure. The fuel feeding structure is described below.

The in-line fuel injection pump has a cylinder as a pump element, and the cylinder includes a plunger barrel having a spill port. A plunger is slidable in the plunger barrel and has an inclined plunger reed formed thereon. Fuel is fed under pressure during a period of time until the spill port faces the plunger reed.

Fuel that is metered by the fuel injection pump is injected by an injection nozzle. In the case where the fuel injection pump is connected to the injection nozzle by an injection pipe, the ignition of fuel may be delayed by a time lag that is caused by the flow of fuel in the injection pipe.

As the rotational speed of the engine is increased, the crankshaft angle by which the crankshaft rotates prior to the fuel ignition becomes larger, and the period of time by which the fuel ignition is delayed is so large that the fuel ignition fails to meet the best fuel combustion timing.

To prevent such a phenomenon from occurring, it has been customary to equip the camshaft of the injection pump with an injection advancing mechanism which employs a timer that operates based on centrifugal forces produced by the rotation of the engine.

The injection advancing mechanism is interposed between the crankshaft of the engine and the camshaft of the injection pump. Under centrifugal forces produced when the crankshaft rotates at high speed, a timer weight of the injection advancing mechanism is displaced radially outwardly to advance the phase of the camshaft from an initial position.

In recent years, it has been considered effective to increase the combustion efficiency of a diesel engine for the purpose of reducing the generation of harmful components in exhaust gases.

In view of such a consideration, it has been proposed to increase the pressure under which fuel is injected.

According to the above proposal, fuel is atomized into fine particles when injected under high pressure, and an increased amount of air is introduced into the mist of fine fuel particles to increase the average excess air factor of the fuel mist for thereby forming a good air-fuel mixture.

However, the proposal has suffered the problems, described below, that the present invention is to solve.

In a fuel injection system including the above injection pump, since the plunger of the injection pump is actuated by a cam, the torque required to drive the cam has to be increased for feeding the fuel under higher pressure, and the injection advancing mechanism has to be increased in size because the cam is required to be large in size.

In addition to the increased size of the injection advancing mechanism, the high-pressure feeding of the fuel also poses a problem in that the pressure under which the fuel is injected is not constant because the rotational speed of the engine varies.

Specifically, the fuel injection pressure goes higher when the rotational speed of the engine is higher, and goes lower when the rotational speed of the engine is lower.

The above phenomenon affects the atomization of the fuel. The high-pressure fuel injection is effective to generate a good air-fuel mixture for the reasons described above insofar as the engine rotates at higher speed. On the other hand, no good air-fuel mixture can be formed when the engine rotates at lower speed because the fuel injection pressure is lower.

For increasing the fuel injection ratio of the injection pump when the engine rotates at lower speed, an attempt would be made to increase the fuel injection pressure in the injection pump to achieve the fuel injection ratio in the lower engine speed range. Such an attempt would result in an excessive fuel injection pressure in the injection pipe in the higher engine speed range, and hence would require the injection pipe to be structurally rigid enough to withstand the excessive fuel injection pressure. This would incur an increase in the production cost. Accordingly, following such an effort would not be a real solution to the problems.

Diesel engines with the above fuel injection system emit harmful components that vary in proportions depending on the vehicle speed and the engine load.

More specifically, harmful components in exhaust gases include hydrocarbon (HC), nitrogen oxides (NOx), and substances, known as particulates, composed of hydrocarbon in unburned gases which is attached around soot particles.

The hydrocarbon (hereinafter also referred to as "HC") is generated in a higher proportion in a relatively low speed range or load range. The nitrogen oxides (hereinafter also referred to as "NOx") are generated in a higher proportion in a high speed or load range where the combustion temperature is relatively high. The particulates do not remain when the temperature in the combustion chamber is high, but remain in a relatively high proportion in a low load or speed range because the HC also remains in a large quantity due to a high temperature in the combustion chamber.

The distributor fuel injection pump includes a single plunger that is reciprocally movable to pressurize fuel and also rotatable to distribute fuel to a plurality of engine cylinders.

The number of parts that the distributor fuel injection pump is made up of is relatively small, and the distributor fuel injection pump can be made smaller in size, as compared with the in-line fuel injection pump.

One distributor fuel injection pump is shown by way of example in FIG. 44 of the accompanying drawings. The distributor fuel injection pump has a pump sleeve 01 in which a plunger 02 is slidably and rotatably disposed. When rotative power is transmitted from an engine to the plunger 02, a roller 04 held in rolling contact with a face cam 03 integral with the plunger 02 causes the plunger 02 to slide for pumping the fuel. The roller 04 is supported by a support 05 that is adjusted in a direction R by a hydraulic pressure timer for adjusting fuel injection timing. A spill ring 06 is fitted over the plunger 02. The rate of fuel to be fed by the fuel injection pump can be adjusted depending on the position in which a spill port 07 is opened by the spill ring 06. However, the conventional fuel injection pump structure has suffered the following disadvantages that the present invention is to eliminate:

The distributor fuel injection pump used in the conventional fuel injection system requires various components including a hydraulic pressure timer, a spill ring, and a governor, for adjusting the rate and injection timing of the fuel, and cannot be sufficiently reduced in size.

The conventional hydraulic pressure timer, spill ring, and governor have a relatively narrow control range, and their control characteristics are limited by the rotational speed range of the engine.

In view of the problems that arise when the injection timing and the injection rate are to be established depending on the rotational speed of the engine, it is a first object of the present invention to provide a fuel injection system having an injection pump and an injection nozzle that are connected by an injection pipe, the fuel injection system being relatively simple in structure and capable of reducing harmful components in exhaust gases even when the rotational speed of the engine and the load on the engine vary.

A second object of the present invention is to provide a fuel injection system having an injection pump and an injection nozzle that are connected by an injection pipe, the injection pipe including a branched portion coupled to a solenoid-operated valve for establishing a fuel feed pressure, the fuel injection system being capable of independently controlling the injection timing and the injection rate depending on the rotational speed of the engine, for thereby reducing combustion noise and harmful components in exhaust gases and effecting fuel injection under optimum conditions for better fuel economy.

A third object of the present invention is to provide a fuel injection system having an injection pump and an injection nozzle that are connected by an injection pipe, the fuel injection system being relatively small in size and having a simple structure for metering fuel and establishing a pressurized fuel feed period in a diesel engine having a plurality of cylinders, and also being capable of suppressing the generation of harmful components in exhaust gases and combustion noise.

A fourth object of the present invention is to provide a fuel injection system having a distributor fuel injection pump which is effective to reduce noise and increase responses and controlling capability.

A fifth object of the present invention is to provide a fuel injection system having a modified cam profile for uniformizing the ratio of pilot fuel injection irrespective of its injection timing for stable fuel combustion, the fuel injection system being also capable of optimizing an interval between pilot fuel injection and main fuel injection.

DISCLOSURE OF THE INVENTION

According to a first feature of the present invention, there is provided a fuel injection system comprising: a fuel pump having a plunger slidably disposed in a plunger chamber defined in a housing and operatively coupled to a cam actuatable by an engine, the fuel tank also having a pressure chamber defined in the housing, for pressurizing fuel supplied from a fuel tank with the plunger; a fuel injection nozzle for being supplied with the fuel from the pressure chamber; and fuel control means for controlling the pressure of the fuel between the pressure chamber and the fuel injection nozzle, the fuel control means comprising a solenoid-operated valve for selectively connecting and disconnecting the pressure chamber and the fuel injection nozzle, and a controller, responsive to control signals indicative of the rotational speed of the engine and the load on the engine, for applying a drive signal to the solenoid-operated valve at a predetermined time within a pressurizing stroke of the plunger.

According to a second feature, in addition to the first feature, the fuel injection pump comprises an inline fuel injection pump in which the plunger is reciprocally movable in the plunger chamber by the cam.

According to a third feature, in addition to the second feature, the controller has an injection advance map for establishing an injection advance depending on the rotational speed and the load, and an injection period map for establishing an injection timing and an injection period depending on the rotational speed and the load, the controller comprising means for actuating the solenoid-operated valve to achieve the injection advance, the injection timing, and the injection period that are established by the maps depending on the rotational speed and the load.

According to a fourth feature, in addition to the second feature, the controller has an injection advance map for establishing an injection advance depending on the rotational speed and the load, and an injection period map for establishing an injection timing and an injection period depending on the rotational speed and the load, the fuel control means having an eccentric-cam timer disposed between a drive shaft of the engine and a driven shaft for driving the cam, and an actuator for actuating the eccentric-cam timer, the controller comprising means for operating the actuator to achieve the injection advance that is established by the injection advance map depending on the rotational speed and the load, and for actuating the solenoid-operated valve to achieve the injection timing and the injection period that are established by the injection period map depending on the rotational speed and the load.

According to a fifth feature, in addition to the third feature, the injection advance map is arranged such that the injection advance is increased as the rotational speed increases from a low speed, high load range toward a high speed, low load range.

According to a sixth feature, in addition to the fourth feature, the injection advance map is arranged such that the injection advance is increased as the rotational speed increases from a low speed, high load range toward a high speed, low load range.

According to a seventh feature, in addition to the third feature, the injection period map is arranged such that the injection period is longer to increase an injection rate as the load is higher.

According to an eighth feature, in addition to the fourth feature, the injection period map is arranged such that the injection period is longer depending on the load.

According to a ninth feature, in addition to the first feature, the plunger has a cylindrical shape with no reed on an outer circumferential surface thereof.

According to a tenth feature, in addition to the first feature, the solenoid-operated valve comprises a normally open solenoid-operated valve for normally keeping the pressure chamber and the fuel tank connected to each other.

According to an eleventh feature, in addition to the first feature, the solenoid-operated valve is connected to a joint portion of an injection pipe by which the fuel pump and the fuel injection nozzle, the fuel pump and the joint portion being spaced by from each other along the injection pipe a distance 1, the joint portion and the fuel injection nozzle being spaced from each other by a distance 2 along the injection pipe, the distances satisfying the relationship: 1>2.

According to a twelfth feature, in addition to the first feature, the controller comprises means for controlling the solenoid-operated valve to inject fuel at a low rate in a pilot injection prior to a main injection.

According to a thirteenth feature, in addition to the twelfth feature, the cam has a cam profile for moving the plunger at a constant speed during the pilot injection irrespective of whether the injection of the fuel is advanced or retarded.

According to fourteenth feature, in addition to the first feature, the cam is rotatable at the same speed as that of the engine, the solenoid-operated valve being arranged to connect the pressure chamber and the fuel injection nozzle to each other once while the cam is making two revolutions, for injecting fuel from the fuel injection nozzle.

According to a fifteenth feature, in addition to the fourteenth feature, the fuel control means comprises an actuating member movable with the cam, and a cam sensor positioned in the path of the actuating member, for applying a signal to the controller, the controller comprising means for controlling the solenoid-operated valve in response to the signal from the cam sensor.

According to a sixteenth feature, in addition to the fifteenth feature, the fuel control means comprises a directional control valve disposed between the solenoid-operated valve and the fuel injection nozzle, and having an outlet connected to as many fuel injection nozzles as the number of cylinders of the engine, and a direction switching member connected to the directional control valve, for detecting a rotational phase when the rotational speed of the cam is a multiple commensurate with the number of fuel injection nozzles, the directional control valve being shiftable, in response to the rotational phase detected by the direction switching member, for supplying fuel to the fuel injection nozzle which is associated with the cylinder in a compression stroke.

According to a seventeenth feature, in addition to the first feature, the fuel pump comprises a distributor fuel injection pump in which the plunger is reciprocally and rotatably movable in the plunger chamber by the cam which is held in rolling contact with rollers supported in the housing.

According to an eighteenth feature, in addition to the seventeenth feature, the controller has an injection advance map for establishing an injection advance depending on the rotational speed and the load, and an injection period map for establishing an injection timing and an injection period depending on the rotational speed and the load, the controller comprising means for actuating the solenoid-operated valve depending on the rotational speed and the load.

According to a nineteenth feature, in addition to the seventeenth feature, the controller has an injection advance map for establishing an injection advance depending on the rotational speed and the load, and an injection period map for establishing an injection timing and an injection period depending on the rotational speed and the load, the fuel control means having an actuator for rotating a support of the rollers with respect to the housing, the controller comprising means for operating the actuator to achieve the injection advance that is established by the injection advance map depending on the rotational speed and the load, and for actuating the the solenoid-operated valve to achieve the injection timing and the injection period that are established by the injection period map depending on the rotational speed and the load.

According to a twentieth feature, in addition to the eighteenth feature, the injection advance map is arranged such that the injection advance is increased as the rotational speed increases from a low speed, high load range toward a high speed, low load range.

According to a twenty first feature, in addition to the nineteenth feature, the injection advance map is arranged such that the injection advance is increased as the rotational speed increases from a low speed, high load range toward a high speed, low load range.

According to a twenty second feature, in addition to the eighteenth feature, the injection period map is arranged such that the injection period is longer to increase an injection rate as the load is higher.

According to a twenty third feature, in addition to the nineteenth feature, the injection period map is arranged such that the injection period is longer to increase an injection rate as the load is higher.

According to a twenty fourth feature, in addition to the first feature, the plunger of the fuel pump is actuatable by the cam through a rocker arm and a push rod.

According to a twenty fifth feature, in addition to the twenty fourth feature, the controller has an injection advance map for establishing an injection advance depending on the rotational speed and the load, and an injection period map for establishing an injection timing and an injection period depending on the rotational speed and the load, the controller comprising means for actuating the solenoid-operated valve to achieve the injection advance, the injection timing, and the injection period that are established by the maps depending on the rotational speed and the load.

With the fuel injection system according to the present invention, when a fuel supply/discharge hole in the fuel pump is closed, the solenoid-operated valve is closed at an injection timing established by the injection period map depending on the rotational speed and the load to increase the pressure in the injection pipe that leads to the pressure chamber in the fuel injection nozzle, for thereby injecting fuel. The injection rate is determined by an interval of time in which the solenoid-operated valve is closed, based on the injection period established by the injection period map.

Since the injection period and the injection rate are determined by opening and closing the solenoid-operated valve, the plunger of the fuel pump does not require any plunger reed unlike the conventional plunger.

Furthermore, when the fuel supply/discharge hole in the fuel pump is closed, the solenoid-operated valve is closed at an injection timing established by the injection period map depending on the rotational speed and the load, and the injection rate is determined by an interval of time in which the solenoid-operated valve remains closed. An injection advance to achieve an optimum combustion condition depending on the rotational speed and the load is established by an hydraulically operated eccentric-cam timer based on the injection rate.

Only when the piston in an engine cylinder moves toward the top dead center in a combustion stroke while the drive cam is rotating, i.e., only at the injection timing, the solenoid-operated valve closes a fuel return passage to inject fuel.

Moreover, a cam phase of the engine is detected based on the rotational phase of the cam of the fuel pump, and the direction in which to feed fuel to a cylinder with its piston reaching the top dead center is selected by the directional control valve. The fuel feed pressure from the fuel pump at the time the solenoid-operated valve is closed is applied to the pressure chamber of the fuel injection nozzle to cause the fuel injection nozzle to inject fuel.

When the piston is shifted from the displacement to the top dead center toward the displacement to the bottom dead center, the directional control valve selects the direction in which to feed fuel to a next cylinder in the combustion stroke.

When the solenoid-operated valve is closed from an open condition and then opened temporarily, fuel is injected at a low rate prior to a main injection.

The controller applies a pilot signal before it produces a main injection signal. Consequently, the fuel injection nozzle effects a pilot injection prior to the main injection.

A normally open solenoid-operate valve selectively disconnects the pressure chamber from a spill pot, and a timer-actuated solenoid-operated valve supplies or discharges fuel under pressure that advances or retards a hydraulic pressure time. Since these solenoid-operated valves are controlled by the controller, the controller is capable of independently adjusting a fuel feed ratio and also an injection timing.

If the injection timing is established while the speed of movement of the plunger is high or low, for varying the injection ratio in the main injection, then the speed of movement of plunger that affects the injection ratio in the pilot injection is rendered constant, thereby preventing the pilot injection ratio from varying.

BRIEF DESCRIPTION OF THE DRAWINGS

FIGS. 1 through 7 show a fuel injection system according to a first embodiment of the present invention.

FIG. 1 is a schematic view of a control arrangement of the fuel injection system according to the first embodiment;

FIGS. 2 and 3 are diagrams showing characteristics of the control arrangement shown in FIG. 1;

FIGS. 4 and 5(A), 5(B), 5(C) are diagrams illustrative of the manner in which the control arrangement shown in FIG. 1 operates;

FIG. 7 is a cross-sectional view showing in detail the fuel injection system shown in FIG. 1.

FIGS. 8 through 14 show a fuel injection system according to a second embodiment of the present invention.

FIG. 8 is a schematic view of a control arrangement of the fuel injection system according to the second embodiment;

FIGS. 9 and 10 are diagrams showing the manner in which the control arrangement shown in FIG. 8 operates including a standard ignition advance (greater than 0) and standard ignition retard (less than 0) in FIG. 10;

FIG. 13 is a diagram illustrative of operation of the control arrangement shown in FIG. 8; and FIG. 14 is a cross-sectional view showing in detail the fuel injection system shown in FIG. 8.

FIGS. 15 through 17(A), 17(B) and 17(C) show a fuel injection system according to a third embodiment of the present invention.

FIG. 15 is a schematic view of the fuel injection system according to the third embodiment; FIG. 16 is a diagram illustrative of a mode of operation of the fuel injection system shown in FIG. 15; and FIG. 16 is a diagram illustrative of another mode of operation of the fuel injection system shown in FIG. 15.

FIGS. 18 through 23 illustrate a fuel injection system according to a fourth embodiment of the present invention.

FIG. 18 is a schematic view of the fuel injection system according to the fourth embodiment;

FIGS. 19(A) through 19(E) are diagrams illustrative of a mode of operation of the fuel injection system shown in FIG. 18;

FIGS. 20 and 21 are cross-sectional views showing modifications of the fuel injection system shown in FIG. 18;

FIGS. 24 through 29 show a fuel injection system according to a fifth embodiment of the present invention.

FIG. 24 is a view of the fuel injection system according to the fifth embodiment;

FIGS. 25(A)-(E) are diagrams illustrative of control characteristics of the fuel control system shown in FIG. 24;

FIG. 26 is a diagram of a map for calculating an injection advance T and an injection ratio ($\Delta q/\Delta t$), the map being stored in a controller of the fuel injection system shown in FIG. 24;

FIG. 27 is a diagram of a map for calculating an injection rate, the map being stored in the controller of the fuel injection system shown in FIG. 24;

FIGS. 28($a$) and 28($b$) are flowcharts of a control program for the fuel injection system shown in FIG. 24; and FIG. 29 is a view of a modification of the fuel injection system shown in FIG. 24.

FIGS. 30 through 34 show a fuel injection system according to a sixth embodiment of the present invention.

FIG. 30 is a view of the fuel injection system according to the sixth embodiment;

FIGS. 31(A)-(E) are diagrams showing operation characteristics of various components of the fuel injection system shown in FIG. 30 upon control operation thereof;

FIGS. 32 and 33 are diagrams of maps for calculating injection timing and a fuel feed ratio, the maps being stored in a controller of the fuel injection system shown in FIG. 30.

FIGS. 35 through 41 show a fuel injection system according to a seventh embodiment of the present invention.

FIG. 35 is a view of the fuel injection system according to the seventh embodiment;

FIG. 36 is a sectional side elevational view of a hydraulic pressure timer in the fuel injection system shown in FIG. 35;

FIG. 37 is a diagram of operation characteristics of the hydraulic pressure timer shown in FIG. 36;

FIG. 38 is a diagram of a map for calculating ΔDu, the map being stored in a controller of the fuel injection system shown in FIG. 35;

FIGS. 39(A)–(E) are diagrams showing operation characteristics of various components of the fuel injection system shown in FIG. 35 upon control operation thereof;

FIGS. 42, 43(a), 43(b), and 43(c) show a fuel injection system according to an eighth embodiment of the present invention.

FIG. 42 is a view of the fuel injection system according to the eighth embodiment, the fuel injection system having a solenoid-operated valve; and FIGS. 43(a), 43(b), and 43(c) are diagrams showing the relationship between an injection ratio, a crankshaft angle, a plunger speed, and a cam profile in the fuel injection system shown in FIG. 42.

BEST MODE FOR CARRYING OUT THE INVENTION

A fuel injection system according to a first embodiment of the present invention will hereinafter be described in detail with reference to FIGS. 1 through 7.

Figure 1:
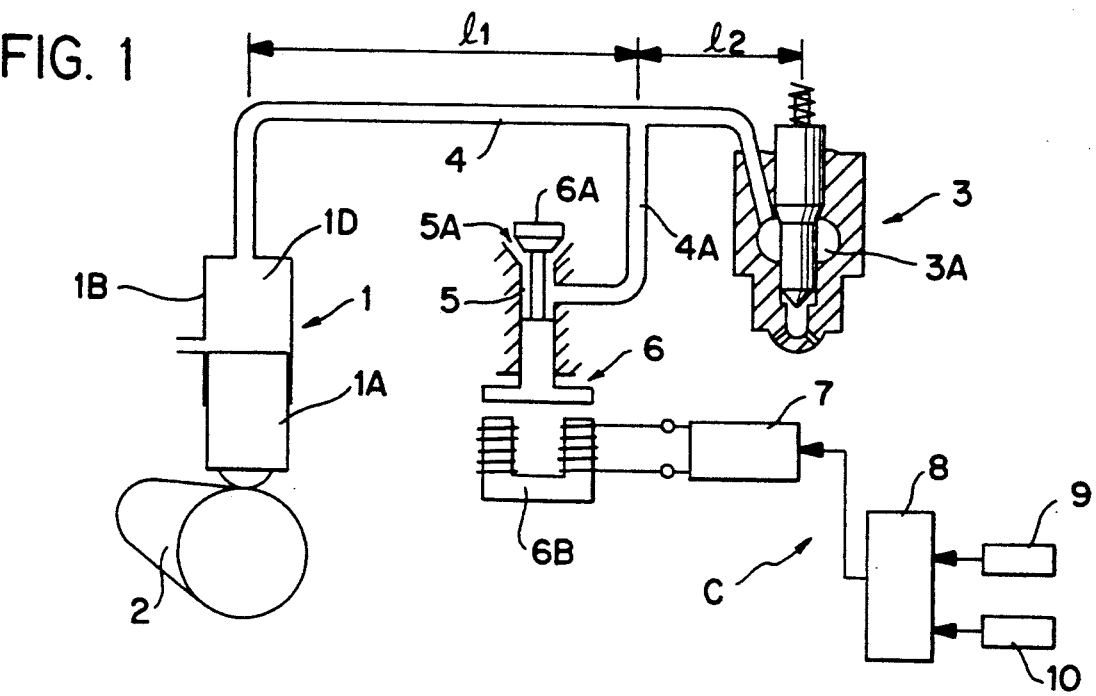
Figure 7:
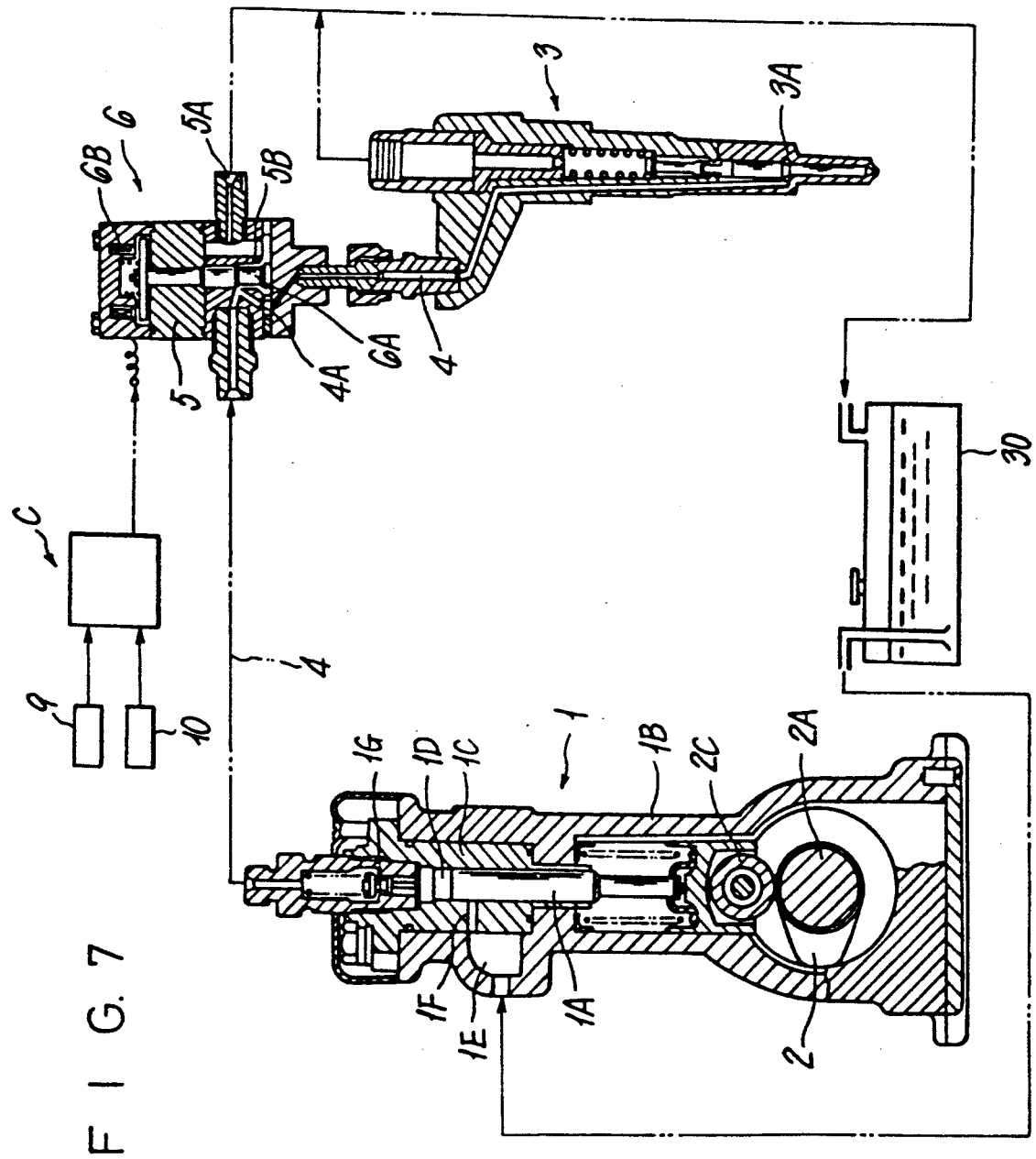

FIG. 1 is a schematic view showing the fuel injection system according to the first embodiment, and FIG. 7 is a cross-sectional view showing in detail the fuel injection system shown in FIG. 1.

In FIGS. 1 and 7, a fuel injection pump 1 has a piston-like plunger 1A that is slidable in a plunger barrel 1C, which is part of a housing 1B, by a drive cam 2 associated with the pump 1.

Fuel fed under pressure by the fuel injection pump 1 is supplied from an injection pipe 4 to a pressure chamber 3A for opening a needle valve in a fuel injection nozzle 3.

The injection pipe 4 is branched off at a position where the distance 1 from the injection pump 1 and the distance 2 up to the injection nozzle 3 satisfy the relationship: 1>2, i.e., a position where the distance up to the injection nozzle 3 is smaller than the distance from the injection pump 1. The branched injection pipe, denoted at 4A, is connected to a cylinder 5.

The cylinder 5 has a portion to which an end of the branched injection pipe 4A is connected, has a fuel return passage 5A at a position different from the portion, the fuel return passage 5A being connected to a fuel tank 30 (see FIG. 7). The cylinder 5 is associated with a solenoid-operated valve 6 that is part of a fuel control means.

The solenoid-operated valve 6 comprises an on/off valve 6A slidably fitted in the cylinder 5, and a solenoid or electromagnet 6B for actuating the on/off valve 6A. The on/off valve 6A is disposed in the fuel return passage 5A in the cylinder 5.

As shown in FIG. 7, the fuel injection pump 1 has a camshaft 2A, which is a driven shaft, for rotating the cam 2. When the camshaft 2A rotates about its own axis, the plunger 1A is reciprocally moved by the cam 2 through a roller 2C. Upon the reciprocating movement of the plunger 1A, fuel is supplied to a fuel chamber 1E and then to a pressurization chamber 1D through an inlet port 1F in the plunger barrel 1C. As the plunger 1A ascends, it closes the inlet port 1F, and forces the fuel from the pressurization chamber 1D through an outlet port 1G to the fuel injection nozzle 3.

The solenoid-operated valve 6 has a cylinder chamber 5B through which the injection pipe 4 and the pressure chamber 3A in the fuel injection nozzle 3 are held in communication with each other. The cylinder chamber 5B and the fuel tank 30 are selectively brought into and out of communication with each other by the on/off valve 6A that is actuatable by the solenoid 6B.

In FIG. 1, the on/off valve 6A has an end facing the solenoid 6B remotely from the fuel return passage 5A. The on/off valve 6A is of the normally open type such that it is normally urged by a biasing means (not shown) to open the fuel return passage 5A.

The solenoid 6B has a coil wound thereon which can be energized by a driver 7 that is electrically connected to a control unit 8.

The driver 7 and the control unit 8 jointly make up a controller C.

The control unit 8 has an output terminal connected to the driver 7 and input terminals connected to an engine speed sensor 9 and a load sensor 10 that detects the amount of depression of an accelerator pedal.

In the first embodiment, the fuel control means includes the controller C in addition to the solenoid-operated valve 6.

Figure 2:
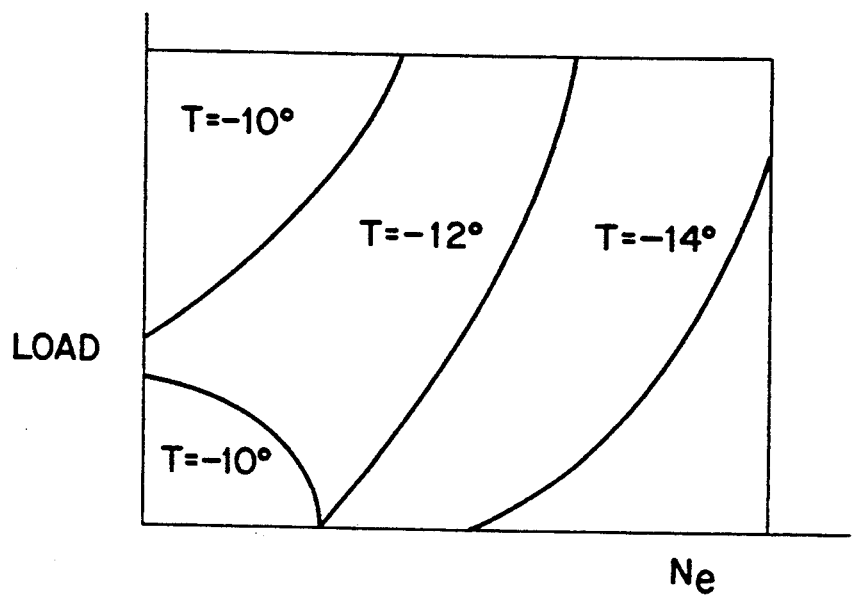
Figure 3:
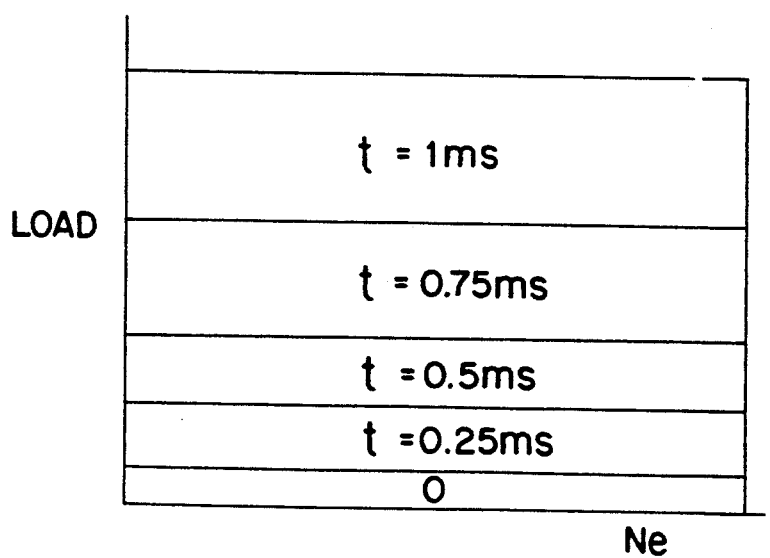

The control unit 8 of the controller C has maps shown in FIGS. 2 and 3, and selects an injection timing and an injection period from the maps depending on the information of the engine speed and the engine load, and outputs a drive signal to the driver 7.

More specifically, the map shown in FIG. 2 indicates injection advances T depending on engine speeds and engine loads, and the map shown in FIG. 3 indicates injection periods t depending on engine speeds and engine loads.

In the map shown in FIG. 2, an injection advance is determined according to the magnitude of an injection ratio that is determined by a differential of an injection rate per unit time. In a higher engine speed range (dq/dt=high, as shown in FIG. 2 by T=−10°, for example), the injection advance is increased to establish an optimum combustion timing with a conventional injection ratio. In a lower engine speed (dq/dt=middle, as shown in FIG. 2 by T=−12° for example, or dq/dt=low, as shown in FIG. 2 by T=−14°, for example), the injection ratio is increased to establish a timing for fuel injection under higher pressure. A map is also provided to cope with an idling engine condition in which the engine rotates at a low speed under a low load.

In the map shown in FIG. 3, an injection period is established to eject a required amount of fuel according to load information irrespective of the engine speed range.

Figure 4:
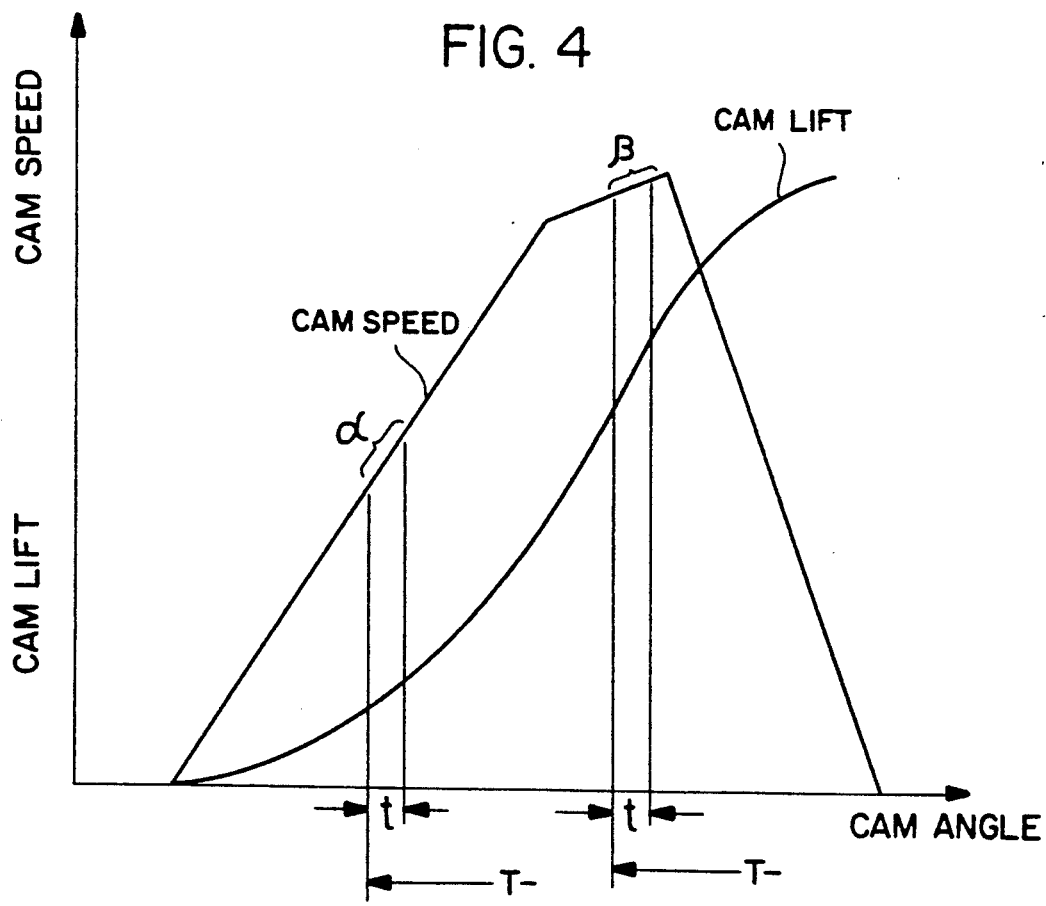

The timing to start injecting fuel based on the map shown in FIG. 2 is determined by selecting an injection advance from the top dead center at a cam angle indicated at T in FIG. 4. The injection period based on the map shown in FIG. 3 is determined by selecting a time interval or duration indicated by t in FIG. 4.

FIG. 4 shows two conditions on the assumption that the same injection period as in the map of FIG. 3 is established, i.e., an injection timing (indicated by β) in the low speed range in the map of FIG. 2 and an injection timing (indicated by α) in the high speed range in the map of FIG. 2. In the low speed range, a higher cam speed is selected, i.e., a higher plunger speed and an increasing fuel feed pressure are selected. In the high speed range, a lower cam speed is selected, i.e., a conventional fuel feed pressure is selected.

Figure 5A:
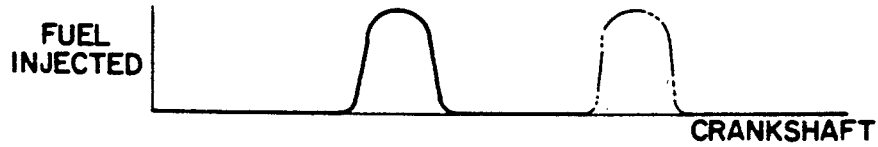
Figure 5B:
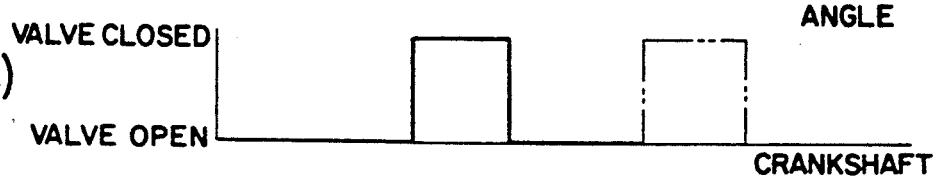
Figure 5C:
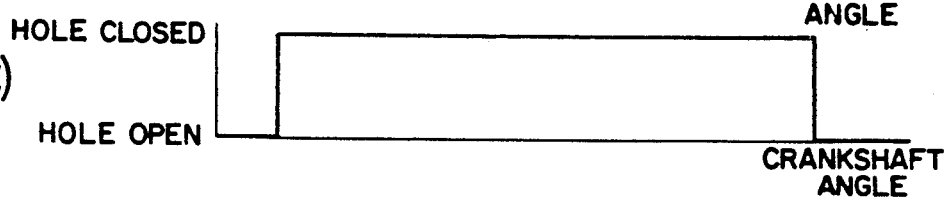

The fuel injection system of the above structure operates according to a timing charts shown in FIG. 5(A)-(C).

When the input information from the engine speed sensor 9 and the load sensor 10 is supplied to the control unit 8 shown in FIG. 1, the control unit 8 selects an injection timing and an injection period from the maps shown in FIGS. 2 and 3, and applies a drive signal to the driver 7.

Therefore, as shown in FIGS. 5(A)-(C), the solenoid-operated valve 6 closes the fuel return passage 5A of the cylinder 5 when the solenoid 6B is energized.

When the fuel supply/discharge hole in the injection pump 1 is closed as the plunger IA of the injection pump 1 ascends, the pressure in the injection pipe 4 up to the injection nozzle 3 is increased and so is the pressure in the pressure chamber 3A, allowing fuel to be injected from the injection nozzle 3.

The two-dot-and-dash-line curves in FIGS. 5(A)-(C) indicate that the timing to start injecting fuel may be modified in the map depending on the engine speed and the engine load provided the injection period remains constant.

Since the injection pipe 4 is branched off at a position near the fuel injection nozzle 3 in the first embodiment, the distance that fuel is required to travel back when the fuel injection is finished may be reduced. Therefore, the fuel can well be cut off when the fuel injection is finished, and the amount of fuel that may be injected under low pressure when the fuel injection is about to be finished may be reduced. As a result, black smokes or residual harmful components, i.e., HC, in exhaust gases, which would otherwise be produced by the fuel injected under low pressure as unburned fuel, may be suppressed, and a wasteful fuel consumption may be lowered.

Figure 6A:
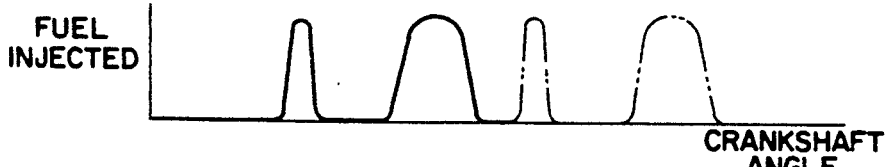
FIGS. 6(A), 6(B) and 6(C) are diagrams illustrative of another mode of operation of the control arrangement shown in FIG. 1.
Figure 6B:
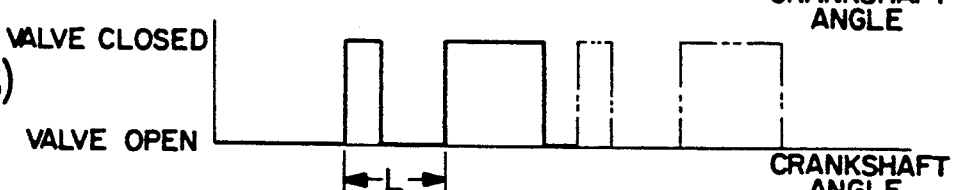
Figure 6C:
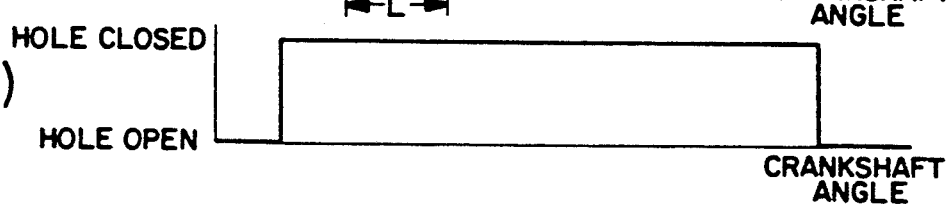

In the fuel injection system according to the first embodiment, the injection timing can be adjusted by adjusting the timing to open and close the solenoid-operated valve 6. Therefore, it is possible, as shown in FIGS. 6(A)-(C), to enable the injection nozzle 3 to inject a smaller amount of fuel for continuous flame propagation in a pilot injection before a larger amount of fuel is injected in a main injection, by an interval L of time. The pilot injection is effective to reduce noise that would otherwise be produced by fuel combustion at one time and also to reduce NOx that would otherwise be generated at higher temperature by concentrated fuel combustion.

Since the injection timing and the injection rate can be established by the solenoid-operated valve, the fuel injection system is highly simple in structure as it no longer requires a timer-operated injection advancing mechanism used to establish an injection timing, a plunger reed on the plunger of the injection pump, and a control rack for varying the position of the plunger reed.

A fuel injection system according to a second embodiment of the present invention will be described below with reference to FIGS. 8 through 14.

Figure 8:
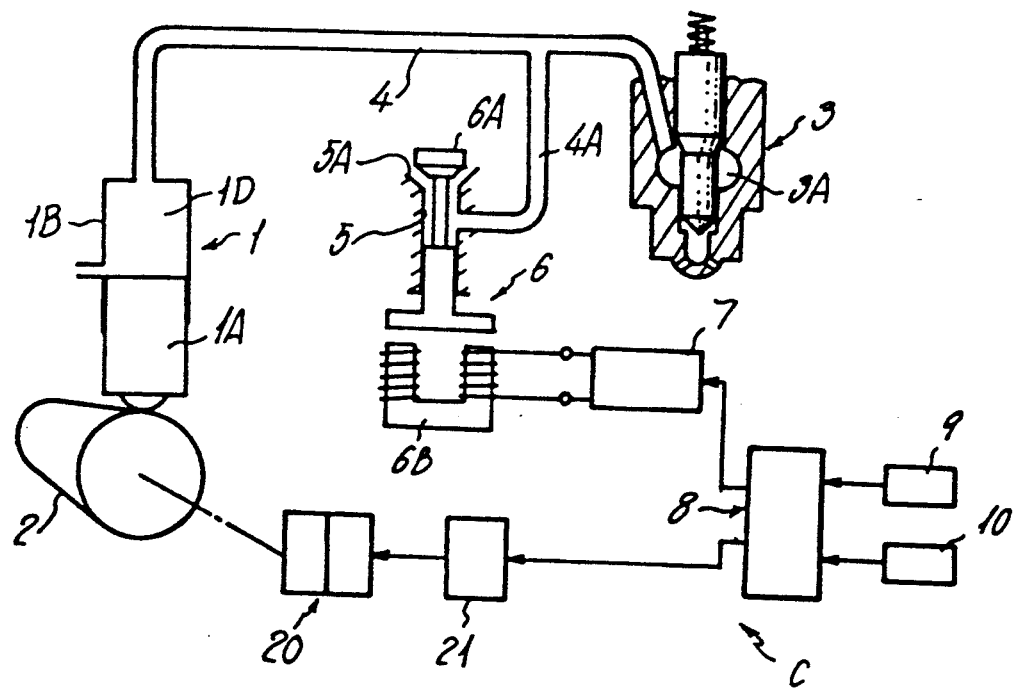
Figure 14:
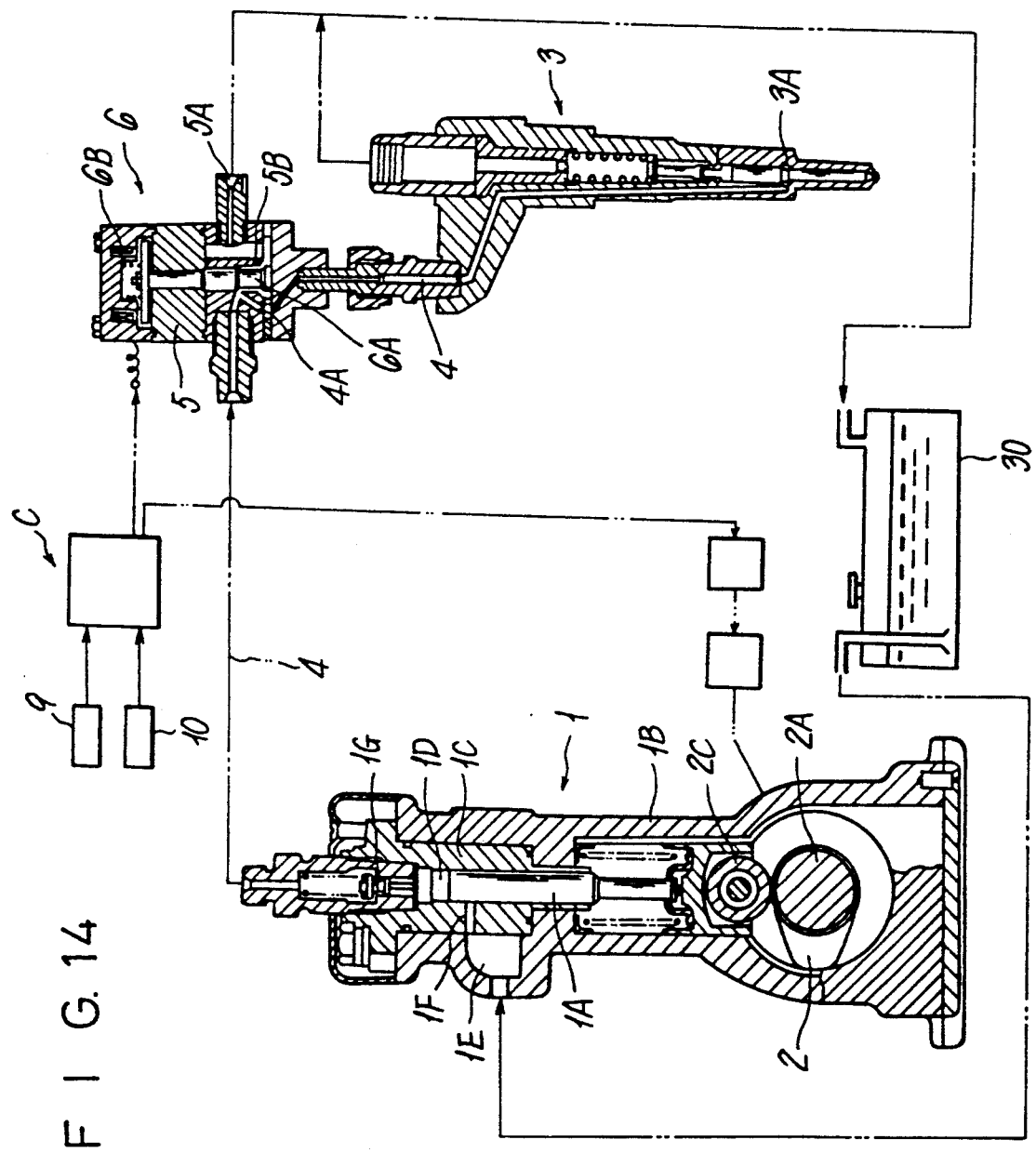

FIG. 8, which is similar to FIG. 1, schematically shows the fuel injection system according to the second embodiment. FIG. 14 shows in detail the cross section of the fuel injection system shown in FIG. 8. Those parts in FIGS. 8 and 14 which are identical to those of FIGS. 1 and 7 are denoted by identical reference characters.

The fuel injection system according to the second embodiment resides in that the injection timing established by opening and closing the solenoid-operated valve and the injection rate are determined by selecting an injection advance with a timer so that combustion noise, vibration sound, and fuel economy will be optimized with respect to the engine speed and the engine load.

The camshaft of the cam 2 of the fuel injection pump 1 is coupled to an eccentric-cam timer 20 of the known hydraulically operated type. The hydraulically operated eccentric-cam timer 20 has a hydraulic pressure actuator in the form of a solenoid-operated directional control valve that is connected to the output terminal of the control unit 8 through a driver 21.

In the second embodiment, the fuel control means comprises the solenoid-operated valve 6, the controller C, the hydraulically operated eccentric-cam timer, and the driver 21.

Figure 9:
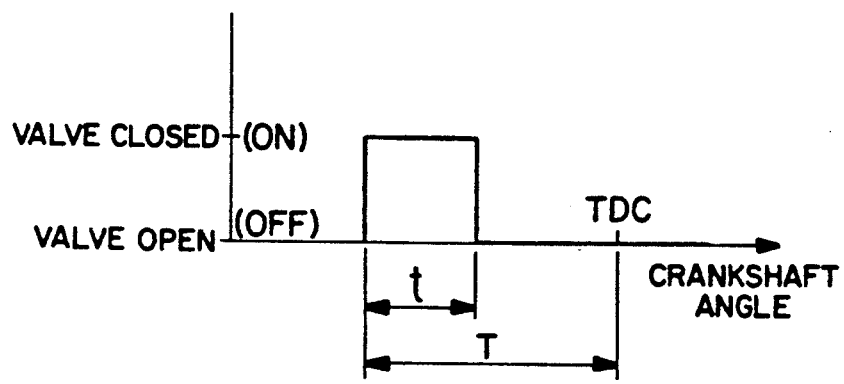
Figure 10:
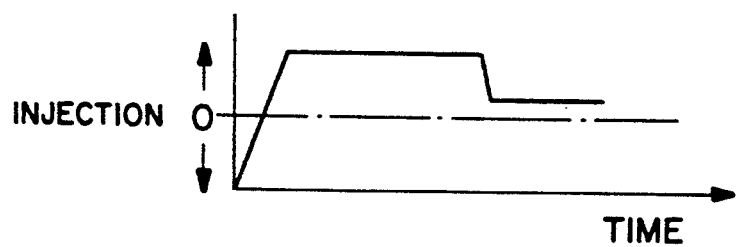

As shown in FIG. 9, the control unit 8 has a map for selecting an injection timing (indicated by T in FIG. 9) and an injection rate (indicated by t in FIG. 9) with respect to the solenoid-operated valve 6, and also a map for achieving an injection advance or retard relative to the phase of the drive cam that serves as a standard.

Figure 11A:
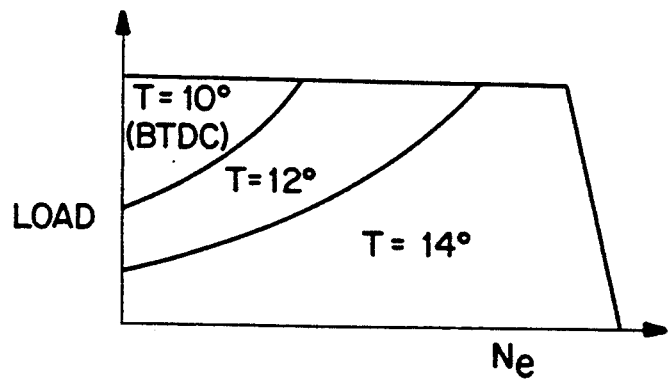
FIGS. 11(A), 11(B), 12(A), 12(B), and 12(C) are diagrams showing various maps used in the control arrangement shown in FIG. 8.
Figure 11B:
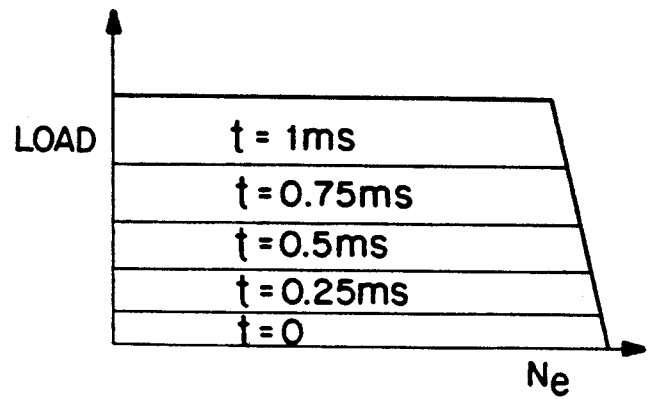
Figure 12A:
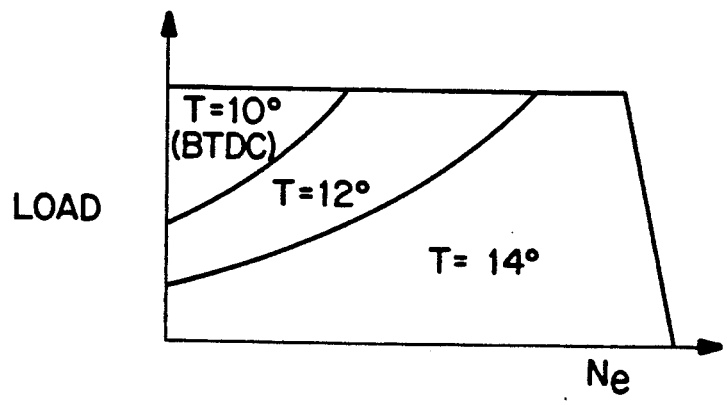
Figure 12B:
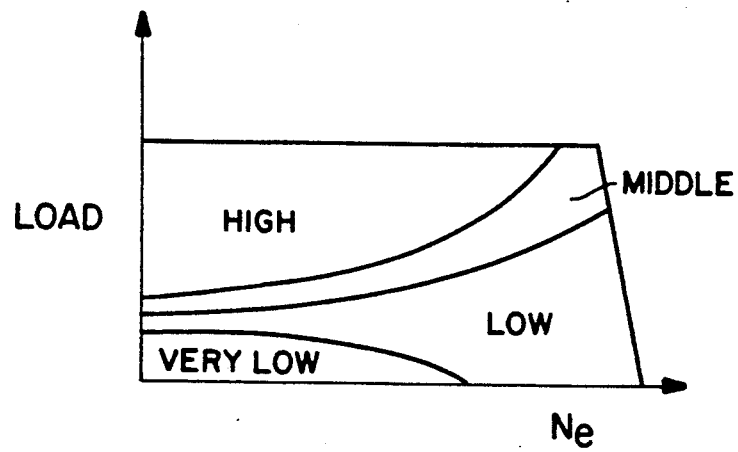
Figure 12C:
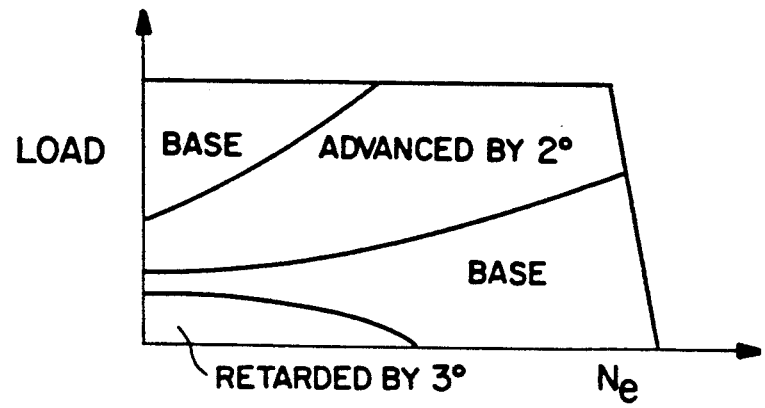

As shown in FIG. 12, the map for establishing an injection advance determines an injection timing shown in FIG. 9 based on the engine speed and the engine load, i.e., an injection timing to obtain an injection timing (see the injection timing (T) of FIG. 12(A)) and see the injection time (T) of FIG. 11(A) on the side of the solenoid-operated valve 6 and an injection ratio (see the injection ratio (dq/dt) FIG. 12(B) and see the injection rate (Q) of FIG. 11(B)) as required by the engine speed and the engine load. With the injection timing selected on the side of the solenoid-operated valve 6 being used as a standard, correctives for obtaining a proper injection ratio based on the injection timing are plotted in a map of advanced/retarded injection (see FIG. 12(C)).

Figure 13:
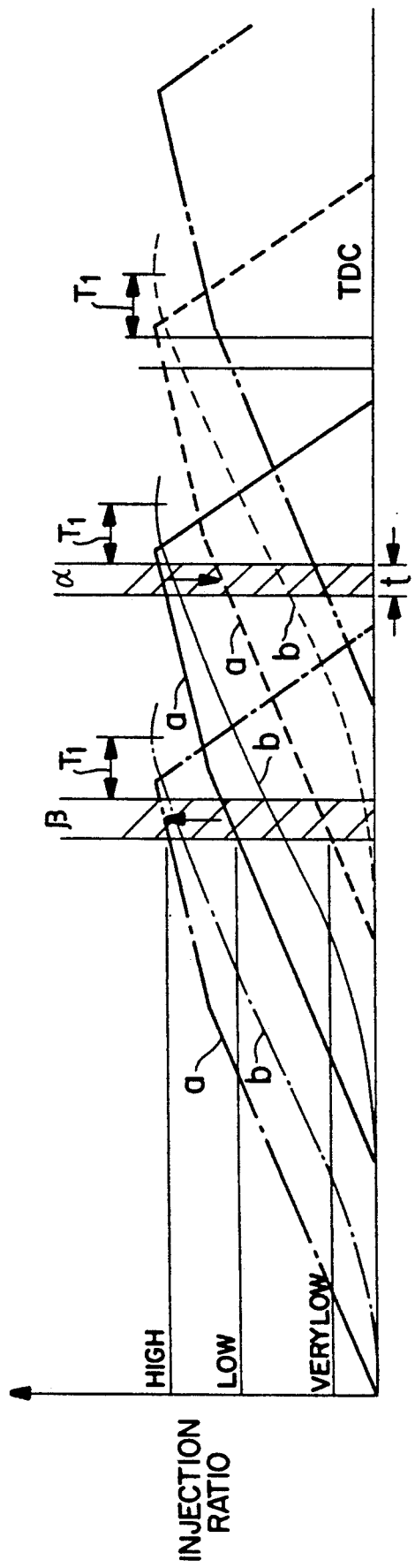

The injecting timing and the injection rate selected on the side of the solenoid-operated valve 6 based on the engine speed and the engine load, CAM SPEED indicated by the solid-line curve in FIG. 13, are corrected in a direction to advance the injection (as indicated by the dot-and-dash-line curve "a" in FIG. 13 and CAM LIFT as indicated by the dot-and-dash-line curve "b" in FIG. 13) or retard the injection (CAM SPEED as indicated by the broken-line curve "a" in FIG. 13 and CAM LIFT as indicated by the broken-line curve "b" in FIG. 13) as selected from the map of advanced/retarded injection.

If the same injection timing (indicated by T1 in FIG. 23) as the injection timing indicated by the solid-line-curve ("a" for CAM SPEED and "b" for CAM LIFT) in FIG. 13 is selected, when the injection timing (indicated by α in FIG. 13) in the low speed range as with the case of FIG. 4 is retarded as indicated by the broken-line curve ("a" for CAM SPEED and "b" for CAM LIFT) in FIG. 13, the injection timing is established such that the fuel feed pressure is low with a low cam speed, i.e., a low plunger speed. Under this condition, the injection ratio is lowered.

Conversely, when the injection timing (indicated by β in FIG. 13) in the high speed range as with the case of FIG. 8 is advanced as indicated by the dot-and-dash-line curve ("a" for CAM SPEED and "b" for CAM LIFT) in FIG. 13, the injection timing is established such that the fuel feed pressure is high with a high cam speed, i.e., a high plunger speed. Under this condition, the injection ratio is increased.

That is, based on the injection timing and the injection rate established on the side of the solenoid-operated valve 6, an injection timing to achieve optimum fuel combustion for not increasing noise and lowering fuel economy with respect to the engine speed and the engine load and also for not leaving harmful components in the exhaust gases is selected from the map for establishing an injection advance as shown in FIG. 12 to establish an injection advance or retard for the timer.

In the fuel injection system according to the second embodiment, when the information about the engine speed and the engine load is supplied to the control unit 8, the control unit 8 selects an injection timing T and an injection rate t from the map shown in FIG. 4, and also selects an injection timing from the map shown in FIG. 12 to obtain an injection ratio depending on the engine speed and the engine load based on the selected injection timing and injection rate, and outputs the selected injection timing to the solenoid-operated valve 6 and the driver 21 for the hydraulic pressure actuator.

The solenoid-operated valve 6 is therefore opened and closed to achieve the ignition timing and the ignition rate from the map, and at the same time the hydraulically operated eccentric-cam timer 20 is operated by the hydraulic pressure actuator through the driver 21 for establishing an injection advance or retard.

A fuel injection system according to a third embodiment of the present invention will be described below with reference to FIGS. 15 through 17.

Figure 15:
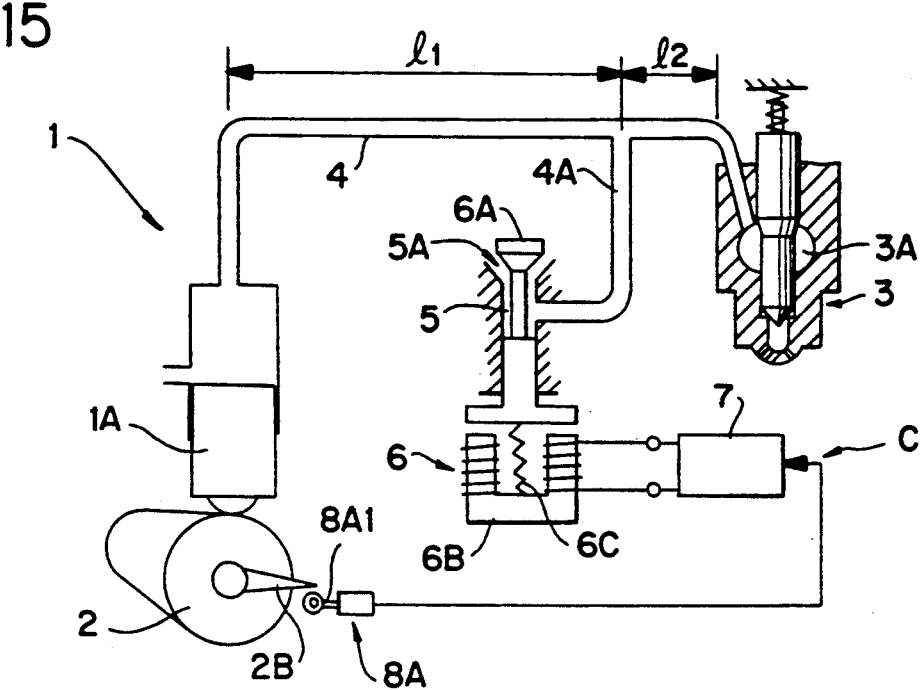

FIG. 15 schematically shows the fuel injection system according to the third embodiment.

In FIG. 15, the fuel injection pump 1 has a piston-like plunger 1A slidably disposed in a plunger barrel by a drive cam 2 associated with the pump 1.

Fuel fed under pressure by the fuel injection pump 1 is supplied from an injection pipe 4 to a pressure chamber 3A for opening a needle valve in a fuel injection nozzle 3.

The injection pipe 4 is branched off at a position where the distance 1 from the injection pump 1 and the distance 2 up to the injection nozzle 3 satisfy the relationship: 1>2, i.e., a position where the distance up to the injection nozzle 3 is smaller than the distance from the injection pump 1. The branched injection pipe, denoted at 4A, is connected to a cylinder 5.

The cylinder 5 has a portion to which an end of the branched injection pipe 4A is connected, has a fuel return passage 5A at a position different from the portion. The cylinder 5 is associated with a solenoid-operated valve 6 serving part of a fuel control means.

The solenoid-operated valve 6 comprises an on/off valve 6A slidably fitted in the cylinder 5, and a solenoid or electromagnet 6B for actuating the on/off valve 6A. The on/off valve 6A is disposed in the fuel return passage 5A in the cylinder 5.

The on/off valve 6A has an end facing the solenoid 6B remotely from the fuel return passage 5A. The on/off valve 6A is of the normally open type such that it is normally urged by a biasing spring 6C to open the fuel return passage 5A.

The solenoid 6B has a coil wound thereon which can be energized by a driver 7 that is part of a controller C. The driver 7 is connected to a cam sensor 8A which functions as a phase sensor, described later on.

In the third embodiment, the fuel control means includes the cam sensor 8A.

The cam sensor 8A detects a timing to open and close the valve on the side of the engine from the rotation of the drive cam 2. The cam sensor 8A comprises a microswitch having an actuator 8A1 positioned in the path of rotation of an actuating lever 2B attached to the shaft of the drive cam 2 that rotates at a speed twice the speed of the engine rotation.

At the top dead center in the compression stroke and also at the top dead center in the intake and exhaust strokes of the piston in the combustion chamber during rotation of the drive cam 2, the drive cam 2 brings the actuating lever 2A into confronting relationship to the cam sensor 8A, thus actuating the actuator 8A1. Signals from the cam sensor 8A are applied to the driver 7 for the solenoid-operated valve 6. The driver 7 supplies a drive current to the solenoid-operated valve 6 to energize the same only when a signal corresponding to the top dead center in the compression stroke is applied thereto once in two revolutions of the drive cam 2, which correspond to one revolution of the engine. Therefore, the solenoid-operated valve 6 is energized once in two revolutions of the drive cam 2.

Figure 16:
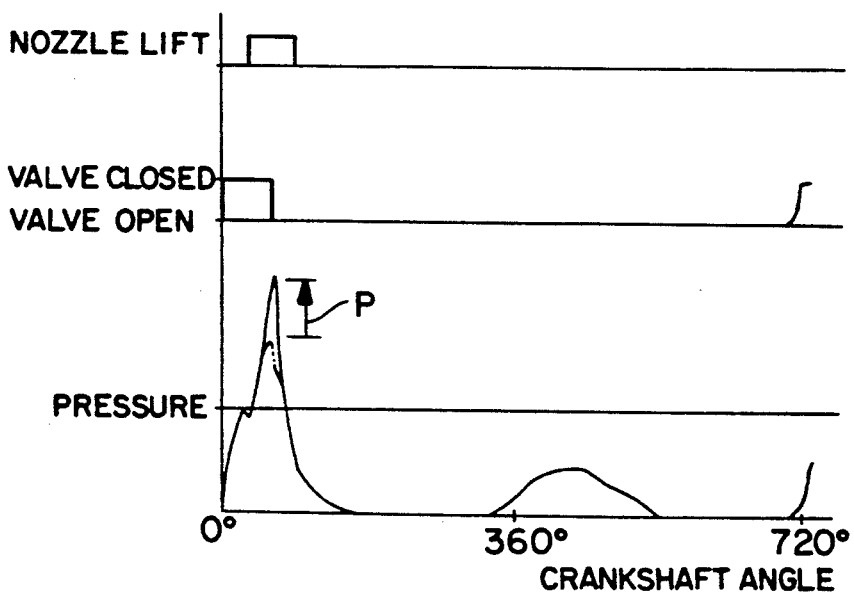

The fuel injection system of the above structure operates according to a timing chart shown in FIG. 16.

When a signal corresponding to the top dead center in the compression stroke of the piston is applied from the cam sensor 8A to the driver 7 once in two revolutions of the drive cam 2, the driver 7 applies a signal to energize the solenoid-operated valve 6.

The solenoid-operated valve 6 actuates the on/off valve 6A to close the fuel return passage 5A against the bias of the spring 6C. When the fuel supply/discharge hole in the injection pump 1 is closed as the plunger 1A of the injection pump 1 ascends, the pressure in the injection pipe 4 up to the injection nozzle 3 is increased and so is the pressure in the pressure chamber 3A, allowing fuel to be injected from the injection nozzle 3.

The speed at which the plunger 1A moves is increased since the rotational speed of the drive cam 2 is higher than that of the crankshaft. Therefore, the speed at which the fuel is fed under pressure is increased, and so is the fuel feed pressure. The increased pressure is indicated by a pressure difference P (FIG. 16) with the conventional injection pressure indicated by the two-dot-and-dash line.

The rotational speed of the drive cam 2 is not limited to being twice that of the engine, but may be an integral multiple of the rotational speed of the engine. One revolution of the drive cam 2 whose rotational speed is an integral multiple of the rotational speed of the engine is used to provide a period for energizing the solenoid-operated valve.

According to the third embodiment, as described above, the injection pipe 4 is branched off at a position where the distance 1 from the injection pump 1 and the distance 2 up to the injection nozzle 3 satisfy the relationship: 1>2, i.e., a position where the distance up to the injection nozzle 3 is smaller than the distance from the injection pump 1, and the end of the branched injection pipe 4A is connected to the cylinder 5. When the solenoid-operated valve 6 is returned to its normally open position, the resistance to the flow of fuel is reduced by the short pipe length from the injection nozzle 3 to the fuel return passage 5A of the cylinder 5. Therefore, after the fuel injection, fuel can return well, and can well be cut off, thereby suppressing the generation of black smokes which would otherwise be emitted by a subsequent fuel flow after the fuel injection.

In the third embodiment, the timing to open and close the solenoid-operated valve 6 may be varied to inject fuel prior to the main injection.

FIGS. 17(A)-(C) show characteristics of such varied timing. When the driver 7 energizes the solenoid 6B of the solenoid-operated valve 6 once in two revolutions of the drive cam 2, the driver 7 does not apply a uniform drive current to the solenoid 6B, but first applies a drive current, then cuts off the drive current after a predetermined period of time to make the solenoid-operated valve 6 open, and then energizes the solenoid 6B again for a predetermined period of time In this manner, as shown in FIGS. 17(A)-(C) prior to the main injection in which a large amount of fuel is injection, fuel is injected at a low rate to effect continuous flame propagation in the combustion chamber, for thereby reducing combustion noise and vibratory noise which would otherwise occur if the fuel were injected at one time. In this case, too, since the rotational speed of the drive cam 2 is increased, the plunger 1A moves at an increased speed, and the injection pressure is made higher by a pressure increase P (FIG. 17(C)), than the injection pressure of the conventional fuel injection system.

The split fuel injection may also be applied after the main injection. That is, fuel may be injected at a low rate as indicated by the two-dot-and-dash lines in FIGS. 17(A)-(C) by energizing the solenoid 6B once more after it has been energized for the main injection, so that NOx, which is one of the harmful components in the exhaust gases, may be reduced.

FIGS. 18 through 23 show a fuel injection system according to a fourth embodiment of the present invention.

FIG. 18 schematically shows the fuel injection system according to the fourth embodiment. In the fourth embodiment, a single plunger in an injection pump is used to distribute fuel to injection nozzles for two engine cylinders.

In FIG. 18, the fuel injection pump 1 has a piston-like plunger 1A slidably disposed in a plunger barrel by a drive cam 2 associated with the pump 1. The rotational speed of the drive cam 2 is a multiple commensurate with the number of injection nozzles to which fuel is distributed. In the illustrated embodiment, the rotational speed of the drive cam 2 is twice the cam speed of the engine.

Fuel fed under pressure by the fuel injection pump 1 is supplied through an injection pipe 4 to pressure chambers 3A, 40A for opening needle valves in fuel injection nozzles 3, 40. In this embodiment, first and second fuel injection nozzles 3, 40 are connected to the the injection pipe.

The injection pipe 4 is branched off into an injection pipe 4A whose end is coupled to a cylinder 5.

The cylinder 5 has a portion to which an end of the branched injection pipe 4A is connected, has a fuel return passage 5A at a position different from the portion. The cylinder 5 is associated with a solenoid-operated valve 6 that serves as a fuel control means.

The solenoid-operated valve 6 comprises an on/off valve 6A slidably fitted in the cylinder 5, and a solenoid or electromagnet 6B for actuating the on/off valve 6A. The on/off valve 6A is disposed in the fuel return passage 5A in the cylinder 5.

The on/off valve 6A has an end facing the solenoid 6B remotely from the fuel return passage 5A. The on/-off valve 6A is of the normally open type such that it is normally urged by a return spring 6C to open the fuel return passage 5A.

The injection pipe 4, from which the injection pipe 4A is branched to the solenoid-operated valve 6, further extends and is connected to an inlet port of a directional control valve 70.

The directional control valve 70 comprises a solenoid-operated spool valve having a firs valve chamber 70A, a second valve chamber 70B, a neutral chamber 70C positioned between the first and second valve chambers 70A, 70B, and a spool 70D slidable in these chambers. One end of the spool 70D confronts a solenoid or electromagnet 70E that shifts the position of the spool 70D.

The directional control valve 70 is held in a normal or initial position, as indicated by the solid lines in FIG. 18, in which the first valve chamber 70A is open to allow fuel to pass therethrough. The directional control valve 70 is normally biased to the normal or initial position by a spring 70F coupled to the solenoid 70E.

To the first and second valve chambers 70A, 70B, there are connected injection pipes 4B, 4C, respectively, that communicate with the respective pressure chambers 3A, 40A of the first and second injection nozzles 3, 40.

The solenoid 70E serves as a drive member for shifting the position of the directional control valve 70 depending on the rotational phase of the drive cam 2 of the injection pump 1.

The rotational speed of the drive cam 2 is selected to be the cam speed of the engine as multiplied by a multiple commensurate with the number of injection nozzles to which fuel is distributed. The rotation of the drive cam 2 is transmitted by a transmitting mechanism 8B to a disc 9 having a circumferential length which is divided into equal lengths corresponding to the number of injection nozzles. The disc 9 has a partly circumferential conductive region 9A. In the illustrated embodiment, the conductive region 9A extends over half of the full circumference of the disc 9 as it is divided into two equal lengths corresponding to the number (two) of injection nozzles. The circumferential surface of the disc 9, including the conductive region 9A, is held against terminals 10A, 11, with the conductive region 9A being part of a closed circuit. These terminals 10A, 11 are electrically connected to the solenoid 70E of the directional control valve 70.

The conductive region 9A and the terminals 10A, 11 jointly serve as a member for establishing a shifted position with respect to the solenoid 70E. When the disc 9 rotates half of one revolution, bringing the conductive region 9A into contact with the terminals 10A, 11, the closed circuit is made, supplying a current to the solenoid 70E. The spool 70E is magnetically attracted to the solenoid 70E against the bias of the spring 70F. The conductive region 9A and the terminals 10A, 11 are relatively positioned such that the closed circuit is broken when the directional control valve 70 is in the initial position.

The solenoid-operated valve 6 with the on/off valve 6A is connected to a phase sensor 8A for detecting the rotational phase of the drive cam 2 through a driver 6D. When the phase sensor 8A detects the arrival of the drive cam 2 at a predetermined angular position before the top of the cam lobe of the drive cam 2 faces the plunger 1A, the phase sensor 8A issues a signal to displace the on/off valve 6A in a direction to close the fuel return passage 5A for a given period of time.

In this embodiment, the fuel control means includes a signal transmitting assembly ranging from the transmitting mechanism 8B to the directional control valve 70.

The fuel injection system according to the fourth embodiment operates as shown in FIGS. 19(A) through 19(E).

More specifically, when the first engine cylinder is in the compression stroke, the injection pipe 4B communicating with the injection nozzle 3 associated with the first engine cylinder is held in communication with the first valve chamber 70A of the directional control valve 70 that is in the initial position.

At this time, the terminals 10A, 11 are held out of contact with the conductive region 9A, and the solenoid 70E remains de-energized. As shown in FIG. 19(A) (illustrating the position of the directional control valve, wherein the first position indicates that the first valve chamber is open and the second position indicates that the second valve chamber is open), the spool 70D is kept in the position in which it closes the second valve chamber 70B.

When the phase sensor 8A detects the arrival of the drive cam 2 at a predetermined angular position before the top of the cam lobe of the drive cam 2 faces the plunger 1A, the solenoid 6B is supplied with an energizing current from the driver 6D for a given period of time as indicated by the two-dot-and-dash lines in FIG. 19(B) (FIG. 19(B) corresponding to solenoid operated valve operation). The on/off valve 6A is now magnetically attracted to the solenoid 6B against the resiliency of the return spring 6C.

Thus, the on/off valve 6A closes the fuel return passage 5A. As the plunger 1A ascends, a pressure buildup is developed in the injection pipe 4 and the first valve chamber 70A, increasing the pressure in the valve chamber 3A of the first injection nozzle 3. When the valve opening pressure is reached, the needle valve of the first injection nozzle 3 is shifted to inject fuel into the combustion chamber as shown in FIG. 19(D) (FIG. 19(D) corresponding to operation of the first fuel injection nozzle and FIG. 19(C) corresponding to operation of the second fuel injection nozzle).

The pressure in the injection pipe 4, i.e., the fuel injection pressure, at this time, varies as indicated by the two-dot-and-dash lines in FIG. 19(E).

When the disc 9 rotates to bring the conductive region 9A into contact with the terminals 10A, 11, the closed circuit is made to apply an energizing current to the solenoid 70E of the directional control valve 70 for thereby shifting the spool 70D against the bias of the spring 70F. Therefore, the spool 70D is displaced downwardly (FIGS. 18 and 19(A)) from the initial position in which the first valve chamber 70A communicates with the injection pipe 4 until the second valve chamber 70B communicates with the injection pipe 4.

When the solenoid 6B is energized as indicated by the solid lines in FIG. 19(B), in the manner described above, under this condition, the pressure in the injection pipe 4 and the second valve chamber 70B increases as the plunger 1A moves upwardly The pressure in the pressure chamber 30A of the second injection nozzle 40 is increased until the valve opening pressure is reached when the needle valve is opened to inject fuel into the combustion chamber. At this time, the injection pressure varies as indicated by the solid lines in FIG. 19(E).

In the fourth embodiment, since the rotational speed of the drive cam 2 is selected as a multiple commensurate with the number of injection nozzles to which fuel is distributed, the rotational speed of the drive cam 2 can be high to increase the speed of movement of the plunger 1A for increasing the pressure under which the fuel is fed for high-pressure fuel injection. Therefore, the fuel can be injected under high pressure while the engine is rotating at low speed or under low load, whereby white smokes and particulates are prevented from being produced.

Figure 20:
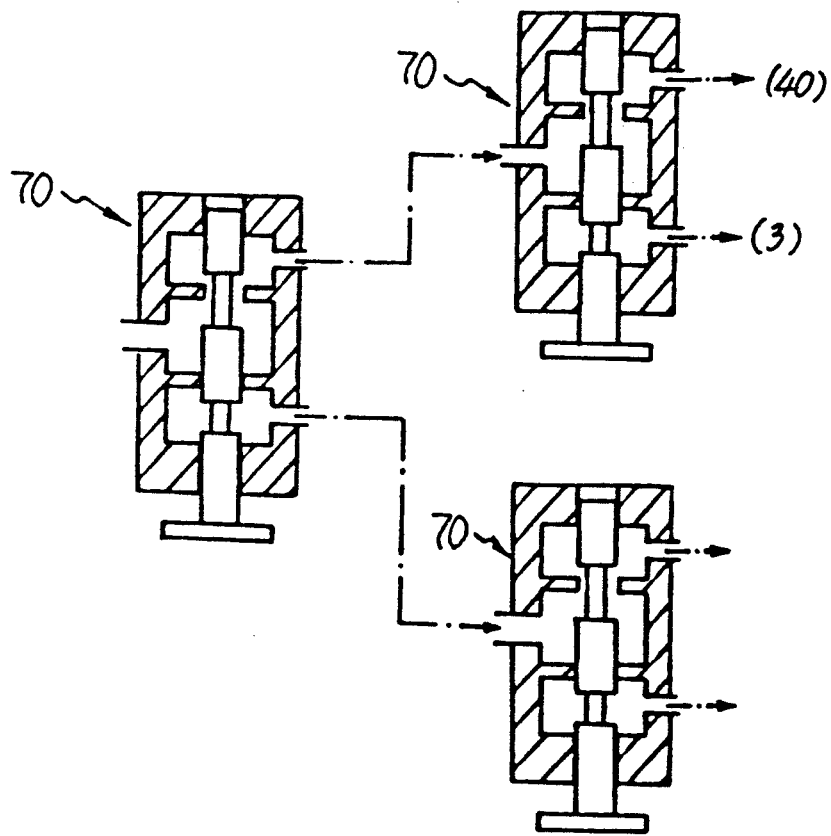
Figure 21:
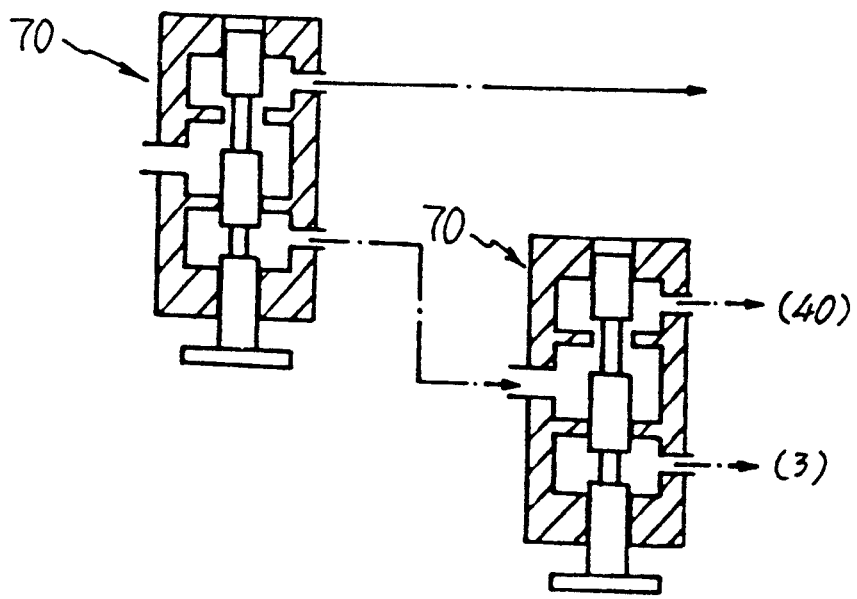

In the case where the directional control valve 70 is in the form of a spool valve as shown in FIG. 18, the number of injection nozzles is not limited to two. As shown in FIGS. 20 and 21, a plurality of directional control valves, identical in structure to the directional control valve 70, may be combined with each other for use with a plurality of injection nozzles. For example, the valve combination shown in FIG. 20 may be used with four injection nozzles, and the valve combination shown in FIG. 21 may be used with three injection nozzles. The spool valve may be replaced with a rotary valve rotatable within a cylinder, as shown in FIGS. 22(A) and 22(B), and the opening of an injection pipe disposed in the rotary valve may be brought into confronting relationship to a selected one, at a time, of injection pipes connected respectively to the injection nozzles.

Figure 22A:
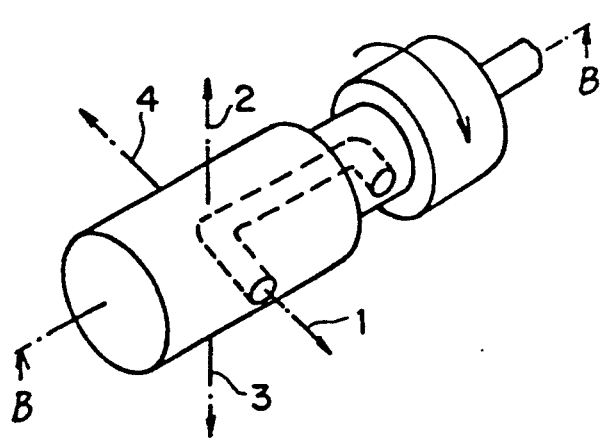
FIG. 22(A) is a perspective view of another modification of the fuel injection system shown in FIG. 18.
Figure 22B:
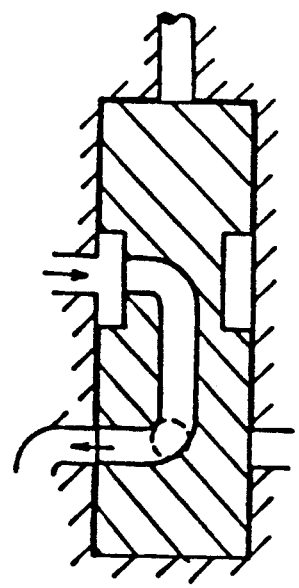
FIG. 22(B) is a cross-sectional view taken along line B—B of FIG. 22(A)

As with the third embodiment, the timing to open and close the solenoid-operated valve 6 may be varied to effect fuel injection prior to the main injection in the fourth embodiment (the arrows 1-4 each corresponding to a respective one of the first to fourth cylinders in FIG. 22(A)).

Figure 23A:
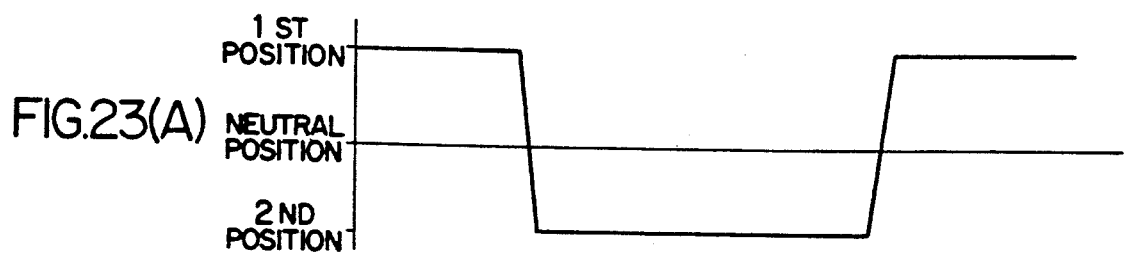
FIGS. 23(A) through 23(E) diagrams illustrative of another mode of operation of the fuel injection system shown in FIG. 18.
Figure 23B:
Figure 23C:
Figure 23D:
Figure 23E:
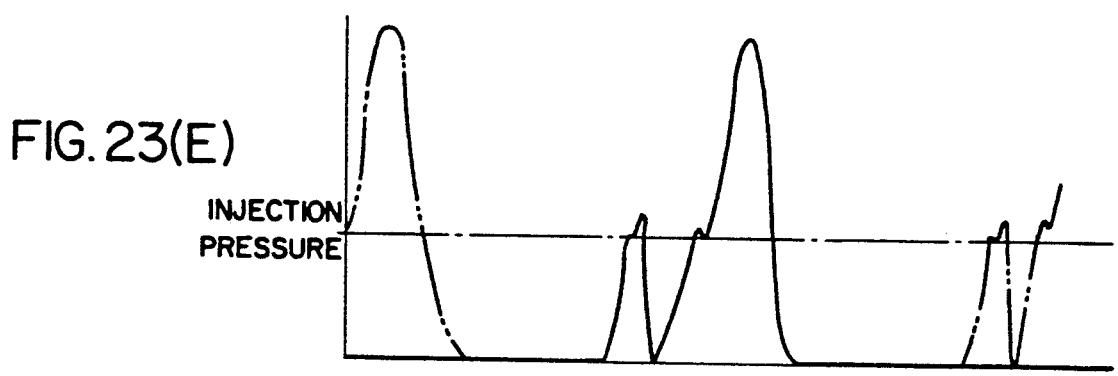

More specifically, FIGS. 23(A)-(E) show characteristics of such varied timing. When the phase sensor 8A detects the arrival of the drive cam 2 at a predetermined angular position before the top of the cam lobe of the drive cam 2 faces the plunger 1A, the driver 6A energizes the solenoid 6B for a given period of time (see FIG. 23(B)). Upon elapse of the given period of time, the driver 6A de-energizes the solenoid 6B, and thereafter energizes the solenoid 6B again (in FIG. 23(E), the midline corresponding to injection pressure is the valve opening pressure). Such a mode of operation allows fuel to be injected at a low rate before the main injection. With the driver 6A being programmed to operate in such a manner, it is possible to reduce combustion noise and vibratory noise which would otherwise occur if the fuel were injected at one time, and also to suppress the generation of harmful components in the exhaust gases due to concentrated fuel combustion (as shown in FIG. 23(B), after the initial opening of the solenoid valve, the next opening of the valve corresponds to a low-rate injection (short pulse) quickly followed by the next opening, the main injection (longer pulses). Further, see FIG. 23(E) corresponding to the same low-rate injection followed by a main injection).

A fuel injection system according to a fifth embodiment of the present invention will now be described below with reference to FIGS. 24 through 28.

Figure 24:
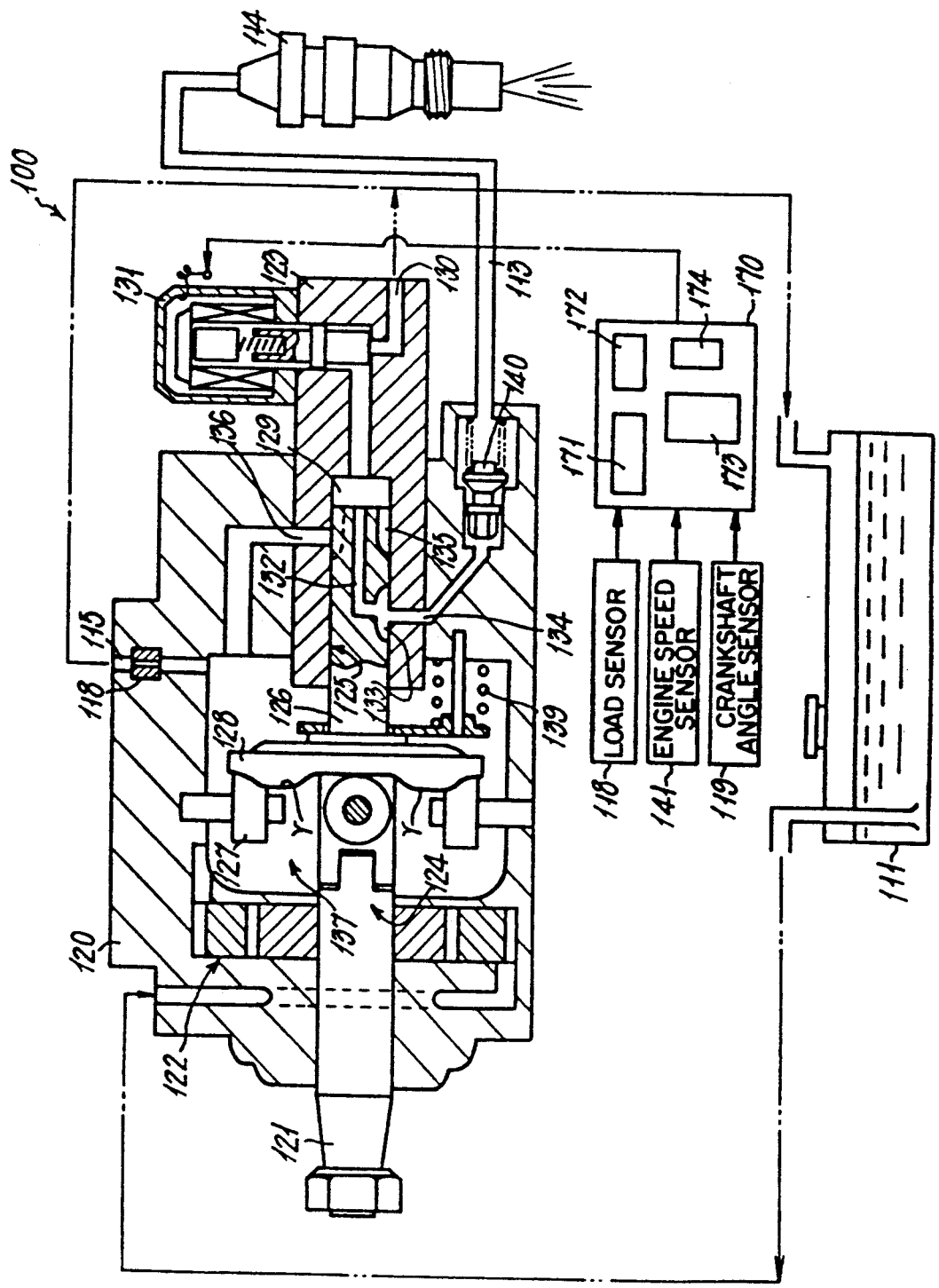
Figure 25:
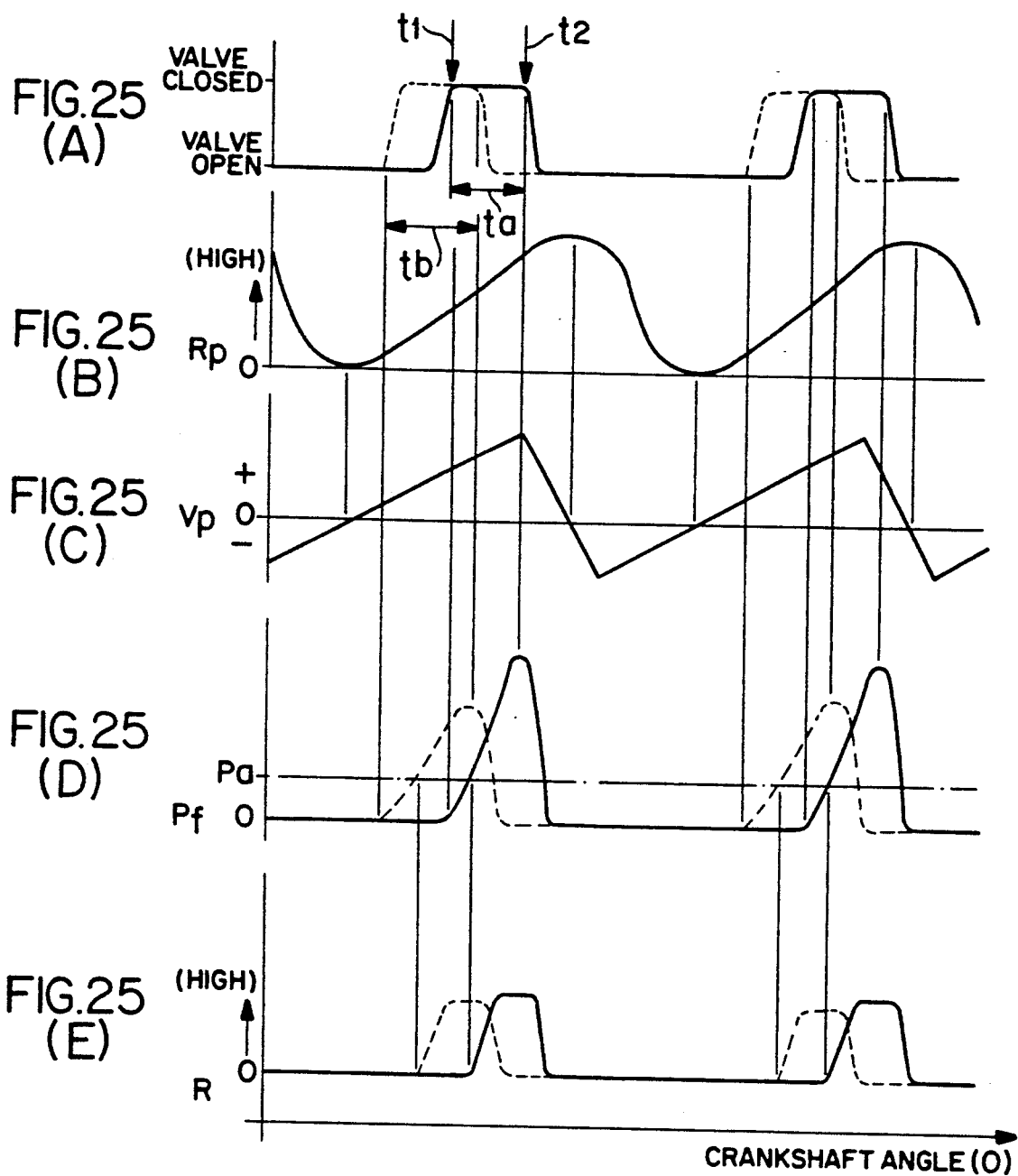

The fuel injection system shown in FIG. 24 is combined with a fuel supply system 100 for a multicylinder diesel engine.

The fuel supply system 100 supplies fuel from a fuel tank 111 through a filter (not shown) to a distributor fuel injection pump (hereinafter referred to simply as an "injection pump") 112. The fuel is then supplied under pressure from the injection pump 112 to a fuel injection valve 114 through an injection pipe 113.

There are as many fuel injection valves 111 as the number of engine cylinders, and these fuel injection valves 111 are connected to the injection pump 112 through respective injection pipes 113. In FIG. 24, only one combination of an injection pipe 113 and a fuel injection valve 114 are shown for illustrative purpose.

The injection pump 112 has a drain passage 115.

The fuel injection system is composed of the distributor fuel injection pump 112, a controller 170 for actuating a normally-open solenoid-operated valve 116 of the injection pump 112, a load sensor 118, a crankshaft angle sensor 119, and an engine speed sensor 141, the sensors being electrically connected to the controller 170.

The fuel injection valve 114 has a needle valve (not shown). When fuel is fed under pressure to the needle valve from the injection pump 112 through the injection pipe 113, the injection pressure Pf in the injection pipe 113 is varied, thereby lifting the needle valve by an interval R to inject fuel in a injection rate pattern as shown in FIGS. 25(A)-(E), for example.

The fuel injection pump 112 comprises a rotatable shaft 121 rotatably supported in a casing 120 as a base body, a feed pump 122 mounted on the rotatable shaft 121, a pump sleeve 123 as part of the base, a plunger 126 coupled to the rotatable shaft 121 by a joint 124 and slidably and rotatably fitted in a plunger hole 125 defined in the pump sleeve 123, a face cam 128 held in rolling contact with four rollers 127 rotatably supported in the casing 120 and reciprocally movable in a direction P, in which the pump operates, normal to the direction in which the face cam 128 rotates, and a normally-open solenoid-operated valve 131 (see FIG. 25(A) corresponding to the opening/closing of solenoid-operated valve) for selectively disconnecting a spill port 130 that communicates with the drain passage 115 from a pressure feed chamber 129 that is part of the plunger hole 125 in the pump sleeve 123.

The face cam 128 has four raised surfaces r. When the four raised surfaces r confront the four rollers 127 respectively, the face cam 128 and the plunger 126 slide in the direction P, thus varying the plunger lift Rp of the plunger 126 as shown in FIG. 25(B) FIG. 25(C) corresponding to plunger lifting speed (Vp), FIG. 25(D) corresponding to fuel injection pressure (Pf), and FIG. 25(E) corresponding to fuel injection valve lift (R)). The joint 124 is arranged to allow the rotatable shaft 121 and the joined end of the plunger 126 to move toward and away from each other, but to rotate in unison with each other.

The plunger 126 has a central passage 132 defined in the other end that communicates with the pressure feed chamber 129. The central passage 132 has a distribution groove 133 in one end thereof which can be positioned in successively confronting relationship to four distribution passages 134 defined in the pump sleeve 126. The plunger 126 also has a suction groove 135 defined therein and opening into the pressure feed chamber 129 at all times. The suction groove 135 can be brought into facing relationship to a suction passage 136 defined in the pump sleeve 123.

The suction passage 136 is connected to the feed pump 122 through a cam chamber 137. The drain passage 115 accommodates an overflow orifice 118 therein. The plunger 126 is normally urged to return under the bias of a return spring 139. One of the distribution passages 134 is connected to the injection pipe 113 through a delivery valve 140.

The solenoid-operated valve 131 is of the normally open type, and can be shifted to a closed position as shown in FIG. 24 when a closing signal is applied thereto.

The controller 170 comprises a control circuit 171, a memory 172, an input/output circuit 173, a driver 174, and a power supply circuit (not shown).

The solenoid-operated valve 131 and the controller 170 jointly serve as a fuel control means.

The input/output circuit 173 of the controller 170 receives detected signals from the load sensor 118, the crankshaft sensor 119, and the engine speed sensor 141 that produces information indicative of the rotational speed of the engine.

Figure 26:
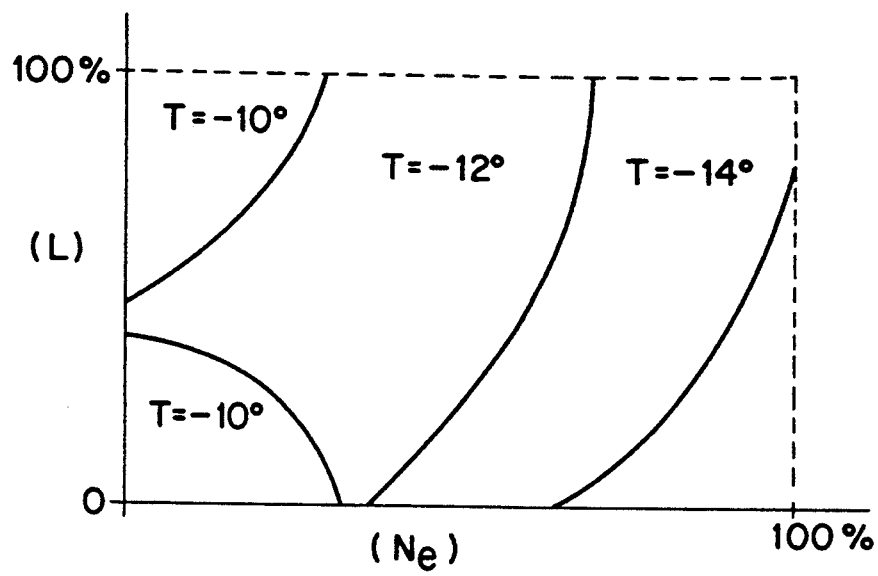
Figure 28A:
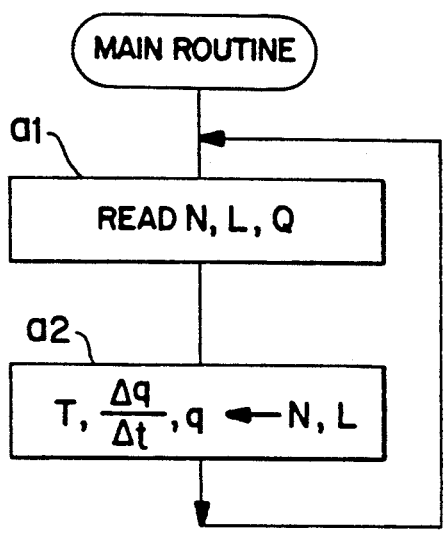
Figure 28B:
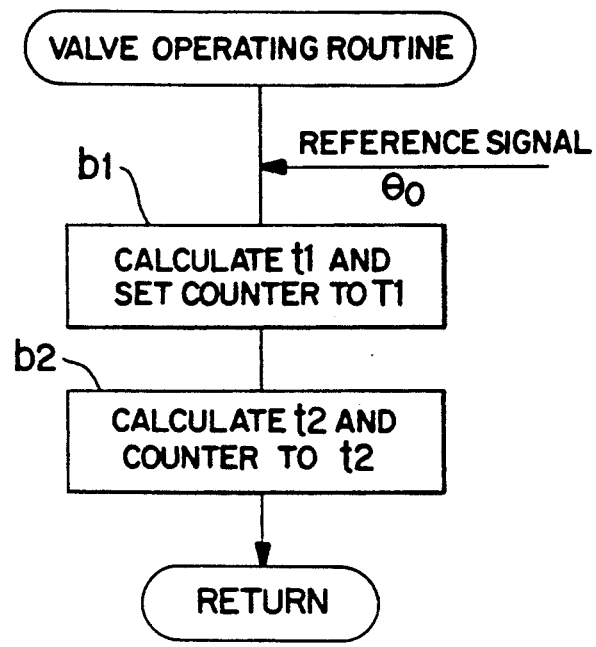
Figure 44:
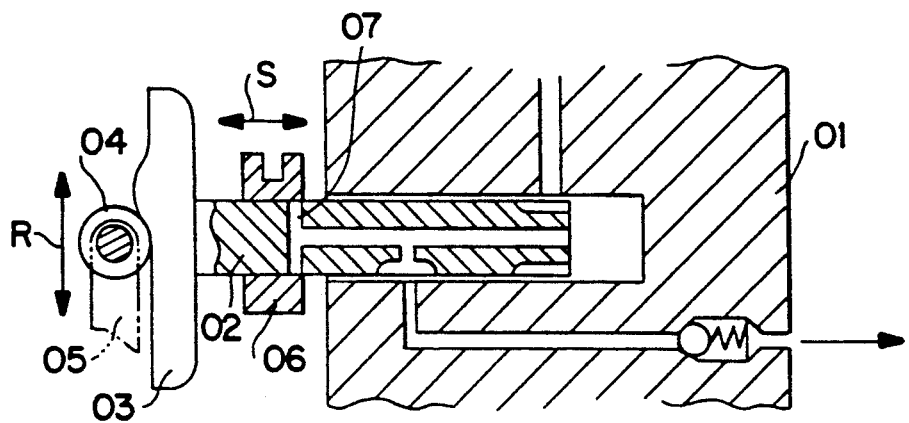
FIG. 44 is a cross-sectional view of a conventional fuel injection system.

The memory 172 stores an injection control program as shown in FIGS. 28(a) and 28(b), and maps for calculating different injection advances T and fuel feed ratios ($\Delta q/\Delta t$) as shown in FIGS. 26 ($dq/dt$=high at $T=-10°$ for example; $dq/dt$=middle at $T=-12°$ for example; and $dq/dt$=low at $T=-14°$ for example) and 27. The map for calculating a injection advance T and a fuel feed ratio ($\Delta q/\Delta t$) as shown in FIG. 26 has the following characteristics:

When the engine operates at a low speed under a high load, the fuel injection is retarded with a high fuel feed ratio ($\Delta q/\Delta t$) (indicated as a zone ta in FIGS. 25(A)-(E)) to inject fuel at high pressure for an increased engine output power. In a high speed range, the advance T is relatively increased, and the injection ratio ($\Delta q/\Delta t$) is made relatively low (indicated as a zone tb in FIGS. 25(A)-(E)) to prevent excessive fuel injection in the high speed range.

Figure 27:
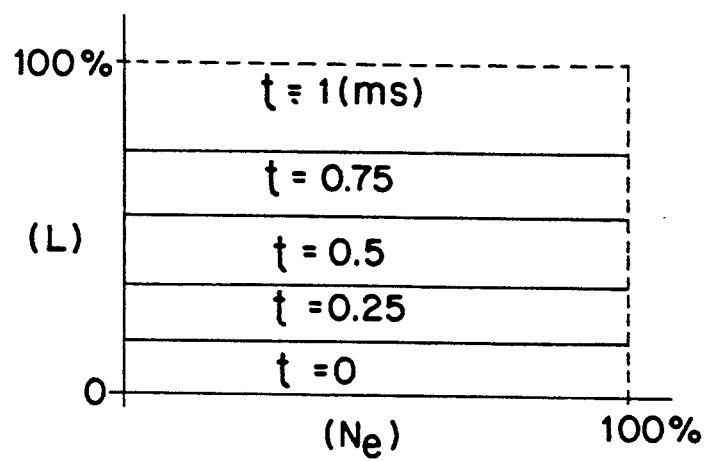

The map for calculating the injection advance shown in FIG. 27 is arranged such that the fuel feed rate (indicated by t) increases as the load (L) increases irrespective of the engine speed (Ne).

The control circuit 171 calculates a controlling quantity according to the injection control program stored in the memory 172, and controls the driver 174 to actuate the solenoid-operated valve 116 according to the calculated controlling quantity for controlling the injection pressure Pf.

Operation of the fuel injection system will now be described below according to the injection control program shown in FIGS. 28(a) and 28(b).

When the main switch (not shown) of the engine is turned on, the controller 170 starts executing a main routine.

First, the controller 170 reads information regarding the present engine speed N, the present engine load L, and the crankshaft angle θ, and stores the information in a given memory area in a step a1.

Then, the controller 170 calculates an injection advance T and a fuel feed ratio (Δq/Δt) depending on the engine speed N and the load L according to the maps shown in FIGS. 26 and 27, and stores the calculated data in a given memory area in a step a2. Thereafter, control goes back to the step a1.

The crankshaft angle signal θ is counted by an interrupt process according to a control routine (not shown). Upon an interrupt based on a reference signal, control goes to a step b1 which calculates a time t1 to actuate the solenoid-operated valve depending on the injection advance T, and sets a counter to the time t1. After elapse of an injection time t in which a fuel rate q can be maintained, a step b2 calculates a time t2 to inactivate the solenoid-operated valve, and sets the counter to the time t2. Then, control returns to the main routine.

While the engine is operating at low speed under high load, the fuel injection system operates with the characteristics in the zone ta shown in FIGS. 25(A)-(E), making it possible to inject fuel at a high oil feed ratio (Δq/Δt) for an increased engine output power in the low speed range. While the engine is operating at high speed under high load, the fuel injection system operates with the characteristics in the zone tb shown in FIGS. 25(A)-(E), making it possible to increase the injection advance T and inject fuel at a low feed ratio (Δq/Δt) for the prevention of excessive fuel injection. Therefore, the durability of the fuel injection mechanism and the engine can be increased, and vibration and noise due to the engine rotation can be reduced.

Since the fuel injection system can dispense with a hydraulically operated timer, a spill ring, and a governor, it may be small in size.

The injection advance T, the injection timing, and the injection rate can accurately be adjusted for increased controllability and response of the injection timing by turning on and off the solenoid-operated valve. Accordingly, white smokes which would otherwise tend to be emitted at the time the engine is started can be reduced, exhaust gases can be reduced under transient conditions, and noise at the time the engine is accelerated can be lowered.

FIG. 29 shows a fuel injection system which is a modification of the fifth embodiment shown in FIGS. 24 through 28. The modified fuel injection system shown in FIG. 29 differs from the fifth embodiment in that the normally open solenoid-operated valve 116 is connected to the injection pipe 113.

More specifically, the injection pipe 113 is branched off at a position where the distance 1 from the injection pump 112 and the distance 2 up to the injection nozzle 114 satisfy the relationship: 1>2, i.e., a position where the distance up to the injection nozzle 114 is smaller than the distance from the injection pump 112. The branched injection pipe is connected at an end thereof to a cylinder chamber 123A.

Since the injection pipe 113 is branched off at a position where the distance 1 from the injection pump 112 and the distance 2 up to the injection nozzle 114 satisfy the relationship: 1>2, i.e., a position where the distance up to the injection nozzle 114 is smaller than the distance from the injection pump 112, and the branched injection pipe is connected at an end thereof to the cylinder chamber 123A, the modified fuel injection system offers the following advantages in addition to those of the fifth embodiment: When the solenoid-operated valve 116 returns to its normally open condition, the resistance to the flow of fuel is reduced by the short pipe length from the injection nozzle 114 to a fuel return passage 125A in the cylinder chamber 123A. Therefore, when the fuel injection is over, the fuel can well be cut off, preventing black smokes from being emitted due to a subsequent flow of fuel.

A fuel injection system according to a sixth embodiment of the present invention will now be described below with reference to FIGS. 30 through 34.

Figure 30:
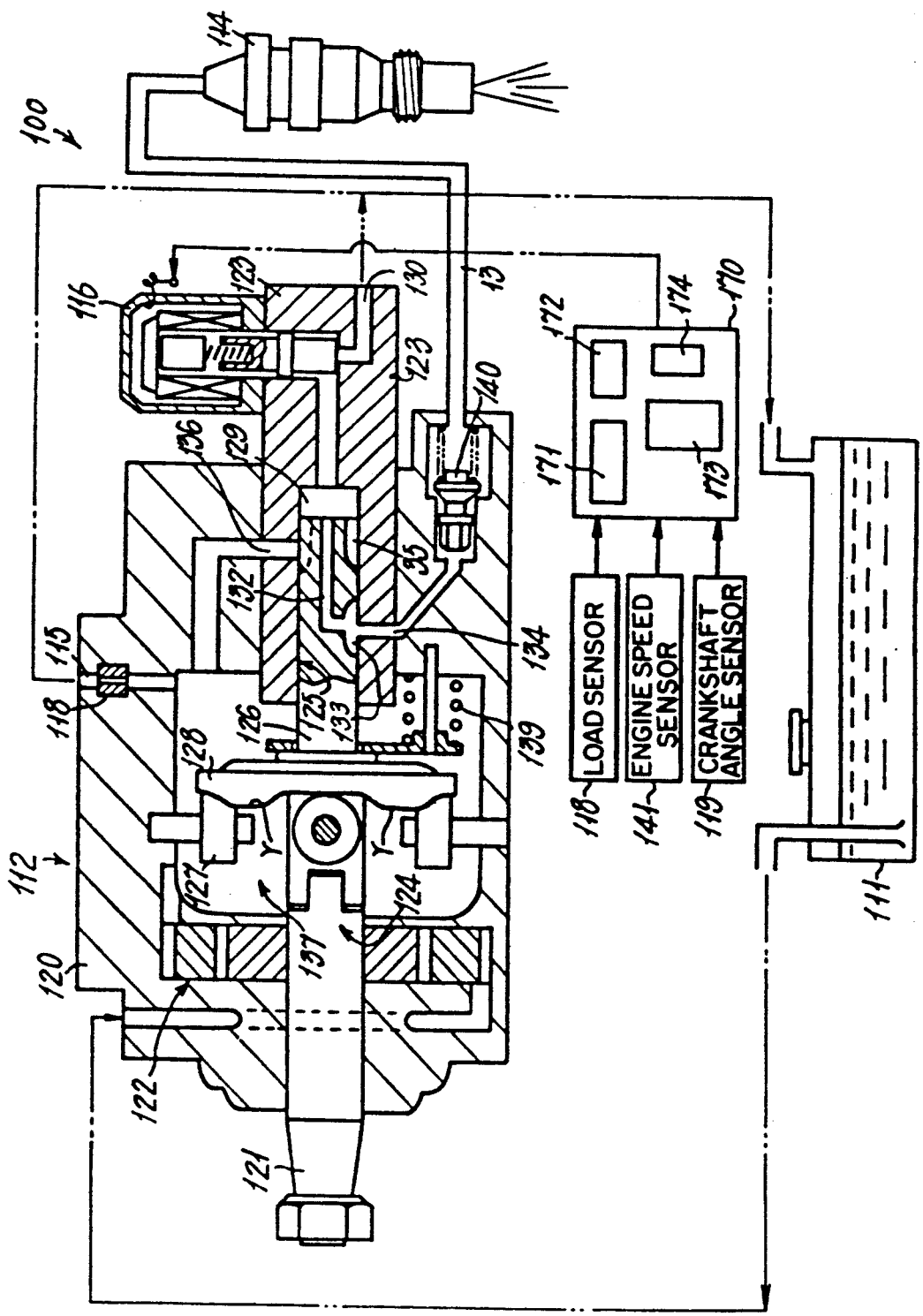
Figure 31:
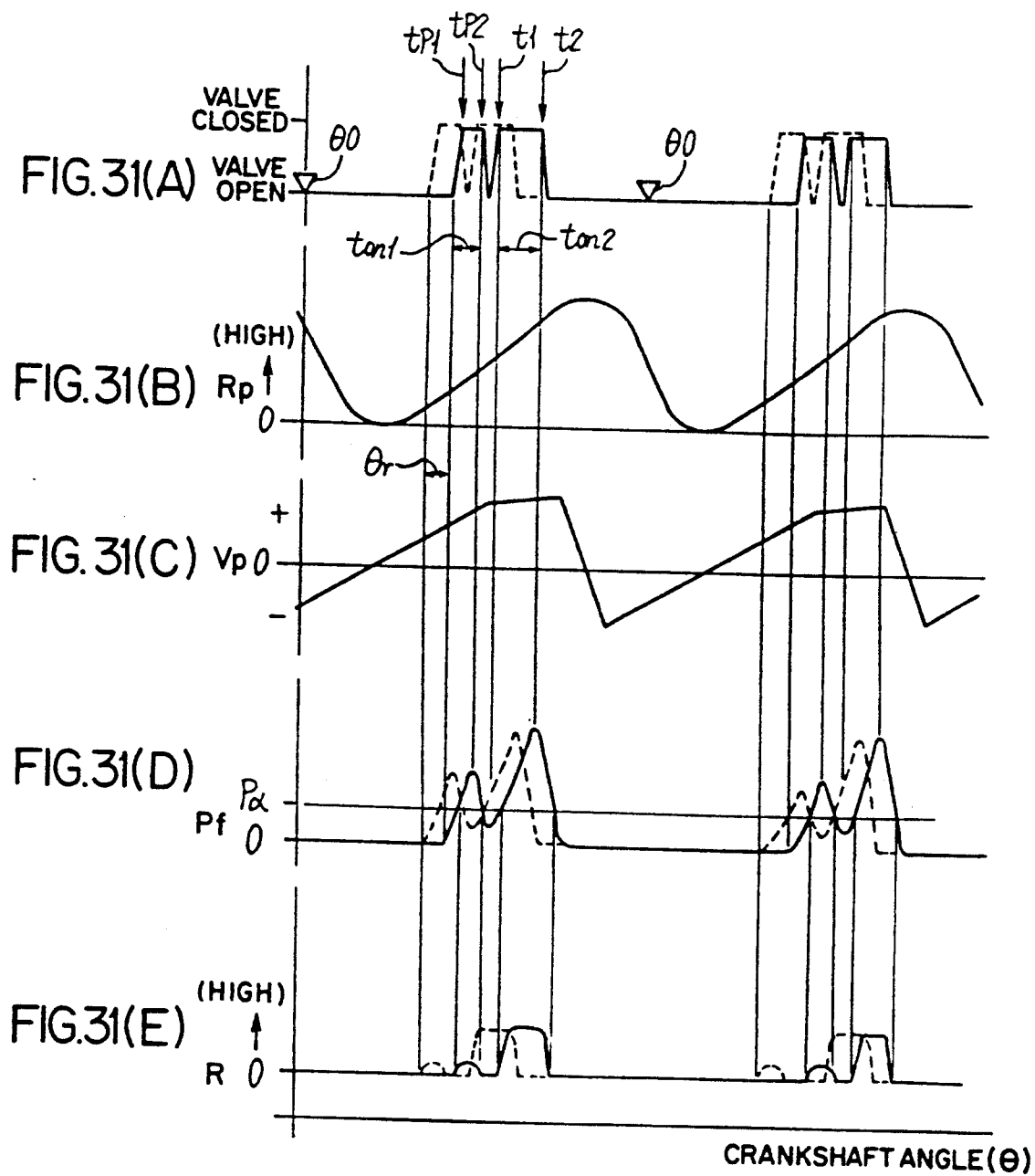

The fuel injection system shown in FIG. 30 is combined with a fuel supply system 100 for a multicylinder diesel engine.

The fuel supply system 100 supplies fuel from a fuel tank 111 through a filter (not shown) to a distributor fuel injection pump (hereinafter referred to simply as an "injection pump") 112. The fuel is then supplied under pressure from the injection pump 112 to a fuel injection valve 114 through an injection pipe 113.

There are as many fuel injection valves 111 as the number of engine cylinders, and these fuel injection valves 111 are connected to the injection pump 112 through respective injection pipes 113. In FIG. 24, only one combination of an injection pipe 113 and a fuel injection valve 114 are shown for illustrative purpose.

The injection pump 112 has a drain passage 115.

The fuel injection system is composed of the distributor fuel injection pump 112, a controller 170 for actuating a normally-open solenoid-operated valve 116 of the injection pump 112, a load sensor 118, a crankshaft angle sensor 119, and an engine speed sensor 141, the sensors being electrically connected to the controller 170.

The fuel injection valve 114 has a needle valve (not shown). When fuel is fed under pressure to the needle valve from the injection pump 112 through the injection pipe 113, the injection pressure Pf in the injection pipe 113 is varied, thereby lifting the needle valve by an interval R to inject fuel in a injection rate pattern as shown in FIGS. 31(A)-(E), for example.

The fuel injection pump 112 comprises a rotatable shaft 121 rotatably supported in a casing 120 as a base body, a feed pump 122 mounted on the rotatable shaft 121, a pump sleeve 123 as part of the base, a plunger 126 coupled to the rotatable shaft 121 by a joint 124 and slidably and rotatably fitted in a plunger hole 125 defined in the pump sleeve 123, four rollers 127 rotatably supported in the casing 120, a face cam 128 held in rolling contact with the four rollers 127, and a normally-open solenoid-operated valve 116 for selectively disconnecting a spill port 130 that communicates with the drain passage 115 from a pressure feed chamber 129 that is part of the plunger hole 125 in the pump sleeve 123.

The face cam 128 has four raised surfaces r. When the four raised surfaces r confront the four rollers 127, respectively, the face cam 128 and the plunger 126 slide in a direction P in which the pump operates, thus varying the plunger lift Rp of the plunger 126 as shown in FIGS. 31(A)-(E) (see FIG. 31(A) corresponding to opening/closing of solenoid operated valve; FIG. 31(B) corresponding to plunger lift Rp; FIG. 31(C) corresponding to plunger lifting speed Vp; FIG. 31(D) corresponding to fuel injection pressure Pf; and FIG. 31(E) corresponding to fuel injection valve lift R).

The joint 124 is arranged to allow the rotatable shaft 121 and the joined end of the plunger 126 to move toward and away from each other, but to rotate in unison with each other.

The plunger 126 has a central passage 132 defined in the other end that communicates with the pressure feed chamber 129. The central passage 132 has a distribution groove 133 in one end thereof which can be positioned in successively confronting relationship to four distribution passages 134 defined in the pump sleeve 126. The plunger 126 also has a suction groove 135 defined therein and opening into the pressure feed chamber 129 at all times. The suction groove 135 can be brought into facing relationship to a suction passage 136 defined in the pump sleeve 123.

The suction passage 136 is connected to the feed pump 122 through a cam chamber 137. The drain passage 115 accommodates an overflow orifice 118 therein. The plunger 126 is normally urged to return under the bias of a return spring 139. One of the distribution passages 134 is connected to the injection pipe 113 through a delivery valve 140.

The solenoid-operated valve 131 is of the normally open type, and can be shifted to a closed position as shown in FIG. 30 when a closing signal is applied thereto.

The controller 170 comprises a control circuit 171, a memory 172, an input/output circuit 173, a driver 174, and a power supply circuit (not shown).

The solenoid-operated valve 116 may be positioned between the fuel injection nozzle 114 and the distributor fuel injection nozzle 112 as with the modification shown in FIG. 29.

The solenoid-operated valve 116 and the controller 170 jointly serve as a fuel control means.

Figure 32:
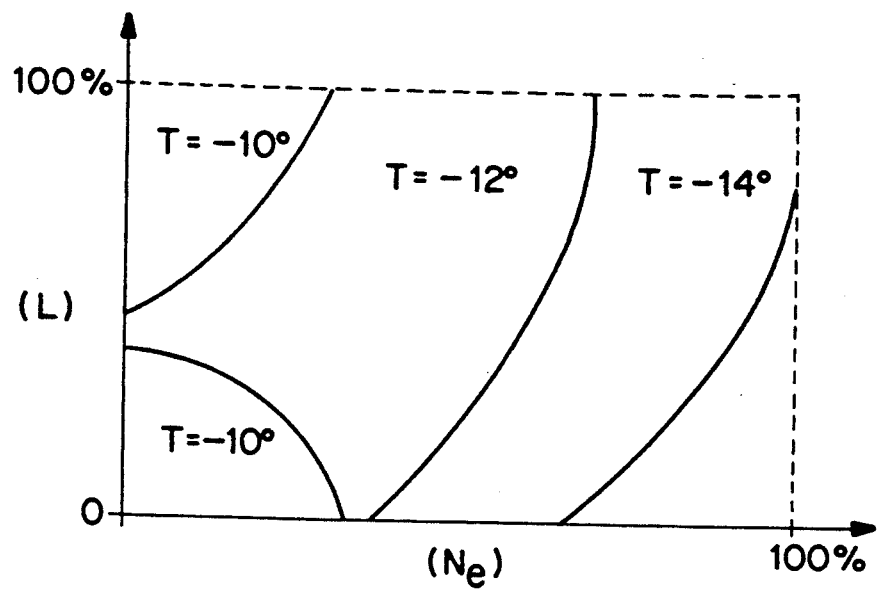
Figure 33:
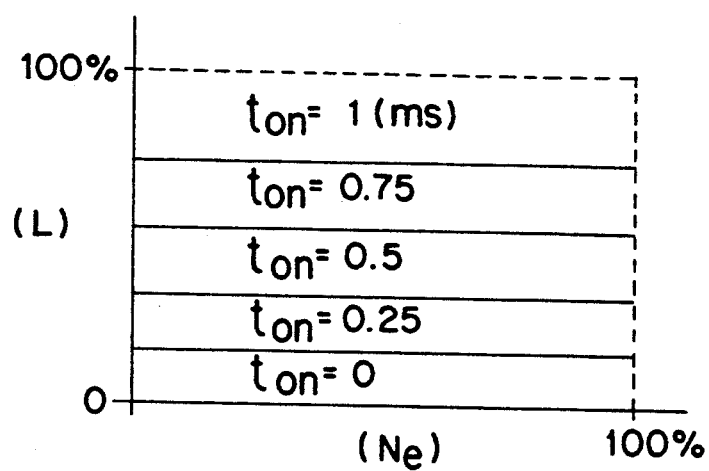
Figure 34A:
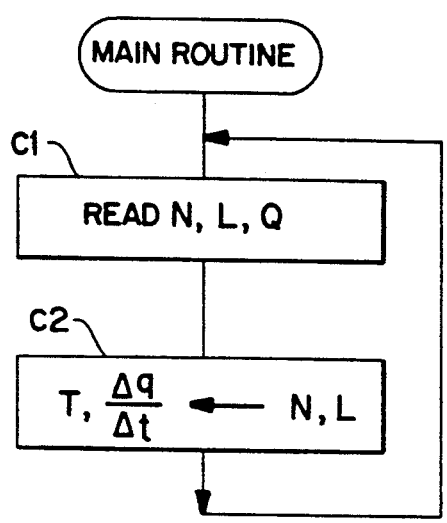
FIGS. 34(a) and 34(b) are flowcharts of a control program for the fuel injection system shown in FIG. 30.
Figure 34B:
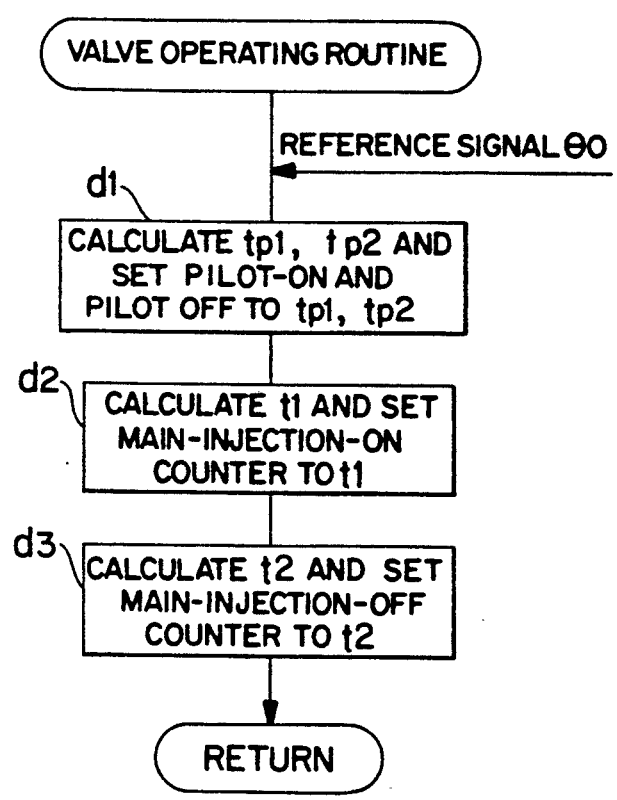

The input/output circuit 173 of the controller 170 receives detected signals from the load sensor 118, the crankshaft sensor 119, and the engine speed sensor 141 that produces information indicative of the rotational speed of the engine. The memory 172 stores an injection control program as shown in FIGS. 34(a) and 34(b), and a map for calculating a injection advance T and a fuel feed ratio ($\Delta q/\Delta t$) as shown in FIG. 32 (wherein $dq/dt$=high, corresponding to T= $-10°$ for example; $dq/dt$=middle, corresponding to T= $-12°$ for example; and $dq/dt$=low corresponding to T= $-14°$ for example), and a map for calculating an injection rate (a value depending on a ON-time ton (=ton1+ton2) for the solenoid-operated valve) as shown in FIG. 33.

When the controller 170 is to control the solenoid-operated valve 116, the controller 170 sets four timers to close the solenoid-operated valve 116 twice for a pilot fuel injection prior to a main injection at each injection timing T.

More specifically, a main injection ON-timer is set when the valve is closed for the main injection, and a main injection OFF-timer is set when the valve is opened for the main injection. A pilot ON-timer is set when the valve is closed for the pilot injection, and a pilot OFF-timer is set when the valve is opened for the pilot injection.

The map for calculating a injection advance T and a fuel feed ratio ($\Delta q/\Delta t$) as shown in FIG. 32 has the following characteristics:

When the engine operates at a low speed under a high load, the injection timing T is retarded with a high fuel feed ratio ($\Delta q/\Delta t$) for an increased engine output power. In a high speed range, the fuel feed ratio ($\Delta q/\Delta t$) is relatively lowered and the injection timing T is advanced to prevent excessive fuel injection for increased durability and reduced particulates and HC. In an idling range, the injection timing is retarded and the fuel feed ratio ($\Delta q/\Delta t$) is increased for stable engine idling and reduced idling noise.

The map for calculating the injection rate q shown in FIG. 27 is arranged such that the injection rate q (a value depending on the ON-time ton for the solenoid-operated valve) increases as the load increases irrespective of the engine speed.

The control circuit 171 calculates a controlling quantity according to the injection control program stored in the memory 172, and controls the driver 174 to actuate the solenoid-operated valve 116 according to the calculated controlling quantity for controlling the injection pressure Pf.

Operation of the fuel injection system will now be described below according to the injection control program shown in FIGS. 34(a) and 34(b).

When the main switch (not shown) of the engine is turned on, the controller 170 starts executing a main routine.

First, the controller 170 reads information regarding the present engine speed N, the present engine load L, the crankshaft angle $\theta$, and the injection timing T, and stores the information in a given memory area in a step c1.

Then, the controller 170 calculates a target injection timing T and a fuel feed ratio ($\Delta q/\Delta t$) depending on the engine speed N and the load L according to the map shown in FIG. 32, and stores the calculated data in a given memory area in a step c2. Thereafter, control goes back to the step c1.

The crankshaft angle signal $\theta$ is counted by an interrupt process according to a control routine (not shown).

Upon an interrupt based on a reference signal, a solenoid-operated valve actuating routine is initiated. Control first goes to a step d1 which calculates a pilot signal ON-time tp1 and a pilot signal OFF-time tp2 for a pilot injection (see ton1 in FIGS. 31(A)–(E)) depending on the target injection timing T, and sets the pilot ON- and OFF-counters to the calculated times, respectively.

Then, control goes to a step d2 which calculates a main injection signal ON-time t1 for a main injection (see ton2 in FIGS. 31(A)–(E)) depending on the target injection timing T, and sets the main injection ON-counter to the calculated time, and which also calculates a main injection signal OFF-time t2 depending on the target injection timing T, and sets the main injection OFF- counter to the calculated time.

Fuel is supplied to the fuel injection valve 114 from the injection pump for the interval of time ton1. When the fuel pressure exceeds the valve opening pressure pa, the fuel injection valve 114 is opened to inject fuel in the pilot injection. Then, fuel is supplied to the fuel injection valve 114 from the injection pump for the interval of time ton2. When the fuel pressure exceeds the valve opening pressure pa, the fuel injection valve 114 is opened to inject fuel in the main injection.

When the injection timing T is advanced, the operating characteristics switch to those indicated by the broken lines in FIGS. 31(A)–(E).

Since the solenoid-operated valve 116 controlled by the controller 170 can effect a pilot injection prior to a main injection, the pressure in the injection pipe is prevented from being built up excessively, and engine noise and NOx can be reduced.

In the high speed and low load range, fuel is injected at a low injection ratio (Δq/Δt) for preventing excessive fuel injection. Therefore, the durability of the fuel injection mechanism and the engine can be increased, and vibration and noise due to the engine rotation can be reduced.

Since the fuel injection system can dispense with a spill ring operated by an accelerator link system having a governor, and also a hydraulic pressure timer for adjusting the injection timing, it may be small in size.

The fuel feed ratio (Δq/Δt) and the injection advance T can accurately be adjusted for increased response thereof when they are controlled by turning on and off the solenoid-operated valve.

A fuel injection system according to a seventh embodiment of the present invention will now be described below with reference to FIGS. 35 through 41.

The fuel injection system shown in FIG. 35 is combined with a fuel supply system 100 for a multicylinder diesel engine.

The fuel supply system 100 supplies fuel from a fuel tank 111 through a filter (not shown) to a distributor fuel injection pump (hereinafter referred to simply as an "injection pump") 112. The fuel is then supplied under pressure from the injection pump 112 to a fuel injection valve 114 through an injection pipe 113.

There are as many fuel injection valves 111 as the number of engine cylinders, and these fuel injection valves 111 are connected to the injection pump 112 through respective injection pipes 113. In FIG. 24, only one combination of an injection pipe 113 and a fuel injection valve 114 are shown for illustrative purpose.

The injection pump 112 has a drain passage 115.

The fuel injection system is composed of the distributor fuel injection pump 112, a controller 170 for actuating a normally-open first solenoid-operated valve 116 of the injection pump 112 and second and third solenoid-operated valves 142, 143 as timer-actuated solenoid-operated valves, a load sensor 118, a crankshaft angle sensor 119, an engine speed sensor 141, and an advance sensor 144, the sensors being electrically connected to the controller 170.

The fuel injection valve 114 has a needle valve (not shown). When fuel is fed under pressure to the needle valve from the injection pump 112 through the injection pipe 113, the injection pressure Pf in the injection pipe 113 is varied, thereby lifting the needle valve by an interval R to inject fuel in a injection rate pattern as shown in FIG. 36, for example.

The fuel injection pump 112 comprises a rotatable shaft 121 rotatably supported in a casing 120 as a base body, a feed pump 122 mounted on the rotatable shaft 121, a pump sleeve 123 as part of the base, a plunger 126 coupled to the rotatable shaft 121 by a joint 124 and slidably and rotatably fitted in a plunger hole 125 defined in the pump sleeve 123, a hydraulic pressure timer 146 for rotating an angularly movable frame 145 on which four rollers 127 are rotatably supported, in a direction R in which the plunger 126 is rotatable, a face cam 128 held in rolling contact with the rollers 127, and the normally-open first solenoid-operated valve 116 for selectively disconnecting a spill port 130 that communicates with the drain passage 115 from a pressure feed chamber 129 that is part of the plunger hole 125 in the pump sleeve 123.

The four rollers 127 are arranged in an annular pattern on the angularly movable frame 145. The angularly movable frame 145 can be actuated by the hydraulic pressure timer 146 through an engagement member of the frame 145.

As shown in FIG. 36, the hydraulic pressure timer 146 comprises a hydraulic pressure chamber 148 defined in the casing 120, and a piston 147 slidably fitted in the hydraulic pressure chamber 148 and normally urged in a retarding direction a by a return spring 149. The hydraulic pressure chamber 148 is supplied with fuel under pressure from the feed pump 122 through the second solenoid-operated valve 142, and returns fuel under pressure to the drain passage 115 through the third solenoid-operated valve 143 in a branch pipe 130. As shown in FIG. 37, as the supplied fuel pressure Po increases, the hydraulic pressure timer 146 is moved in an advancing direction b (FIG. 36) to angularly move the rollers 147 on the frame 145 from a minimum advance position (min) to a maximum advance position (max).

Each of the second and third solenoid-operated valves 142, 143 comprises a duty-ratio valve whose valve opening ratio increases as the duty ratio Du thereof increases.

The face cam 128 has four raised surfaces r. When the four raised surfaces r confront the four rollers 127, respectively, the face cam 128 and the plunger 126 slide in the direction P, thus varying the plunger lift Rp of the plunger 126 as shown in FIGS. 39(A)-(E) (FIG. 39(A) corresponding to solenoid-operated valve opening/closing; FIG. 39(B) corresponding to plunger lift Rp; FIG. 39(C) corresponding to plunger lifting speed Vp; FIG. 39(D) corresponding to fuel injection pressure Pf; and FIG. 39(E) corresponding to fuel injection valve lift R). The joint 124 is arranged to allow the rotatable shaft 121 and the joined end of the plunger 126 to move toward and away from each other, but to rotate in unison with each other.

The plunger 126 has a central passage 132 defined in the other end that communicates with the pressure feed chamber 129. The central passage 132 has a distribution groove 133 in one end thereof which can be positioned in successively confronting relationship to four distribution passages 134 defined in the pump sleeve 126. The plunger 126 also has a suction groove 135 defined therein and opening into the pressure feed chamber 129 at all times. The suction groove 135 can be brought into facing relationship to a suction passage 136 defined in the pump sleeve 123.

The suction passage 136 is connected to the feed pump 122 through a cam chamber 137. The drain passage 115 accommodates an overflow orifice 118 therein. The plunger 126 is normally urged to return under the bias of a return spring 139. One of the distribution passages 134 is connected to the injection pipe 113 through a delivery valve 140.

The first solenoid-operated valve 116 is of the normally open type, and can be shifted to a closed position as shown in FIG. 35 when a closing signal is applied thereto.

The controller 170 comprises a control circuit 171, a memory 172, an input/output circuit 173, drivers 174, 175, and a power supply circuit (not shown).

The solenoid-operated valve 116 may be interposed between the fuel injection nozzle 114 and the distributor fuel injection pump 112 as with the modification shown in FIG. 29.

The solenoid-operated valve 116 and the controller 170 jointly serve as a fuel control means.

The input/output circuit 173 of the controller 170 receives detected signals from the load sensor 118, the crankshaft sensor 119, the engine speed sensor 141 that produces information indicative of the rotational speed of the engine, and the advance sensor 114 that detects the injection timing T from the side of the hydraulic pressure timer 146.

Figure 40A:
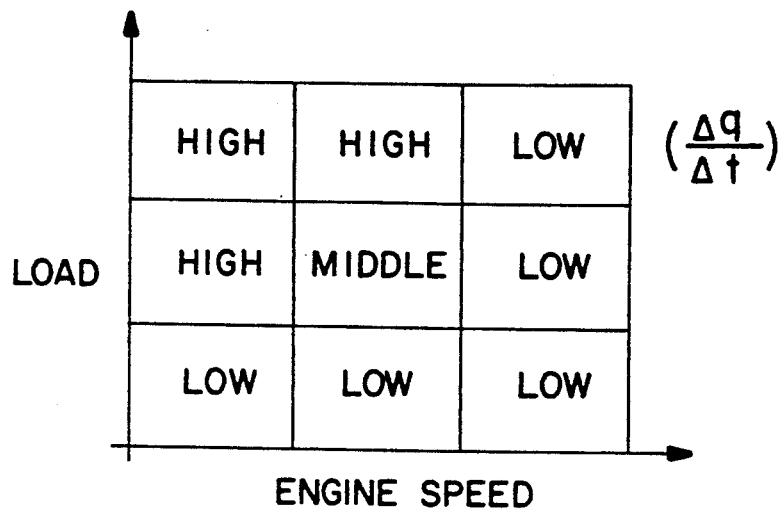
FIGS. 40(a) and 40(b) are diagrams of maps for calculating an injection ratio (Δq/Δt) and an injection advance T, the maps being stored in the controller of the fuel injection system shown in FIG. 35.
Figure 40B:
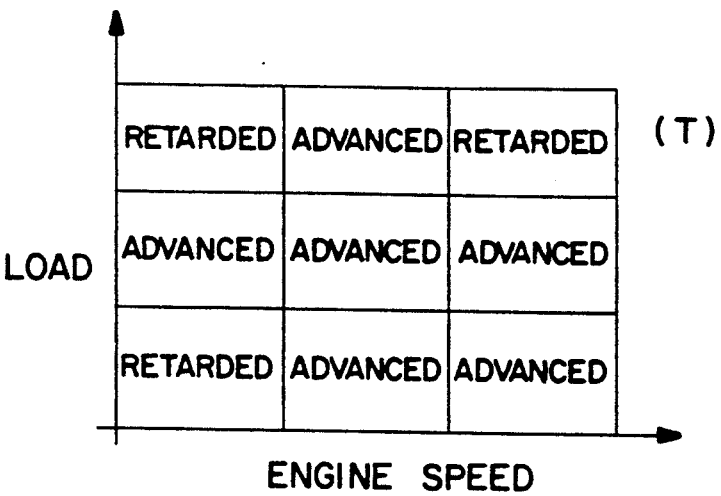
Figure 41A:
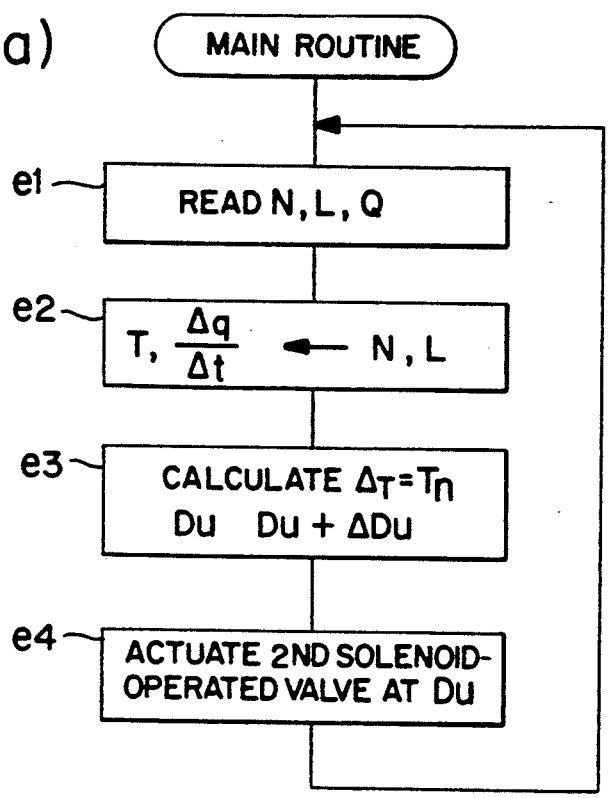
FIGS. 41(a) and 41(b) are flowcharts of a control program for the fuel injection system shown in FIG. 35.
Figure 41B:
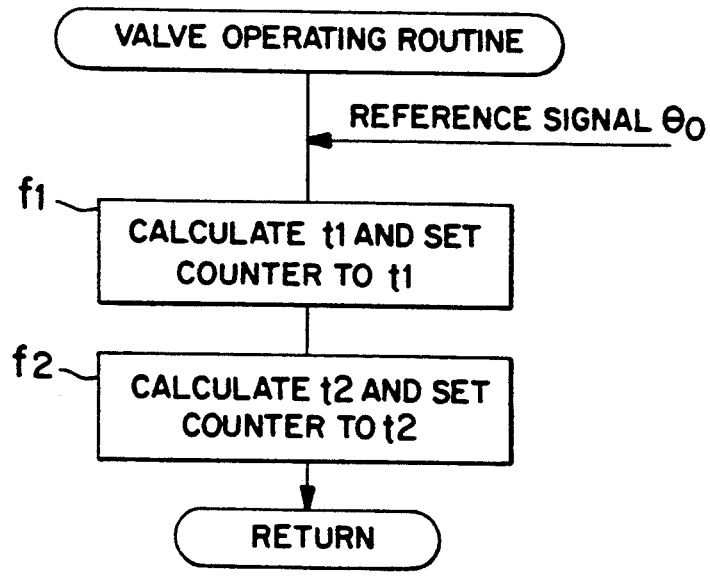

The memory 172 stores an injection control program as shown in FIGS. 41(a) and 41(b), and a map for calculating a duty ratio for the second and third solenoid-operated valves 142, 143 for adjusting the injection timing T of the hydraulic pressure timer, as shown in FIG. 38, maps for calculating a feed ratio ($\Delta q/\Delta t$) and an injection timing T as shown in FIGS. 40(a) and 40(b).

The map for calculating a fuel feed ratio ($\Delta q/\Delta t$) as shown in FIG. 40(a) has the following characteristics:

When the engine operates under a low load in a full range or at a high speed in a full range, the fuel feed ratio ($\Delta q/\Delta t$) is lowered to prevent excessive fuel injection for increased durability and reduced particulates and HC. When the engine operates at a low or medium speed under a medium or high load, the fuel feed ratio is increased to achieve a higher engine output power due to fuel injection under pressure.

The map for calculating an injection timing T as shown in FIG. 40(b) has the following characteristics:

When the engine operates at a low speed under a low load, the fuel injection is retarded to reduce idling noise. When the engine operates at a high speed under a high load, the fuel injection is also retarded for increased engine durability and reduced exhaust gases and HC.

The control circuit 171 calculates a controlling quantity according to the injection control program stored in the memory 172, and controls the driver 174 for the first solenoid-operated valve 116 and the driver 175 for the second and third solenoid-operated valves 142, 143 for controlling the injection pressure Pf.

Operation of the fuel injection system will now be described below according to the injection control program shown in FIGS. 41(a) and 41(b).

When the main switch (not shown) of the engine is turned on, the controller 170 starts executing a main routine.

First, the controller 170 reads information regarding the present engine speed N, the present engine load L, the crankshaft angle $\theta$, and the injection timing T, and stores the information in a given memory area in a step e1.

Then, the controller 170 calculates a target injection timing T and a fuel feed ratio ($\Delta q/\Delta t$) depending on the engine speed N and the load L according to the maps shown in FIGS. 40(a) and 40(b), and stores the calculated data in a given memory area in a step e2.

Then, a step e3 calculates the difference $\Delta T$ ($=T-Tn$) between the present injection timing Tn and the target injection timing T, and determines a duty ratio $\Delta Du$ corresponding to the difference $\Delta T$ from the duty ratio map shown in FIG. 38. The step e3 also corrects and updates the present duty ratio Du by adding or subtracting $\Delta Du$.

The step e3 is followed by a step e4 in which the second and third solenoid-operated valves 142, 143 are actuated with the updated duty ratio Du. Thereafter, control goes back to the step e1. If the present injection timing Tn is to be further advanced by the difference $\Delta T$, then the corrective $\Delta Du$ is of a positive value, and the duty ratio for the second solenoid-operated valve 142 is updated and outputted to actuate the second solenoid-operated valve 142. On the other hand, if the present injection timing Tn is to be retarded by the difference $\Delta T$, then the corrective $\Delta Du$ is of a negative value, and the duty ratio for the third solenoid-operated valve 143 is updated and outputted to actuate the third solenoid-operated valve 143.

The crankshaft angle signal $\theta$ is counted by an interrupt process according to a control routine (not shown). Upon an interrupt based on a reference signal, control goes to a step f1 which calculates a time t1 to actuate the solenoid-operated valve depending on the present injection timing T, and sets a counter to the time t1. Then, a step f2 calculates a time t2 to inactivating the solenoid-operated valve to obtain an injection time t in which a fuel injection rate q can be maintained depending on the load information L, and sets the counter to the time t2. Then, control returns to the main routine.

According to the above processing, the fuel injection valve 114 is supplied with fuel from the injection pump for a predetermined interval of time (t1~t2). When the fuel pressure exceeds the valve opening pressure pa, the injection valve is opened to inject fuel to achieve the characteristics according to the maps shown in FIGS. 40(a) and 40(b).

With the fuel injection system, the first solenoid-operated valve 116 controlled by the controller 170 can adjust the fuel feed ratio ($\Delta q/\Delta t$) (the fuel feed ratio in the interval tb shown in FIG. 39 is lower than that in the interval ta), and the injection timing T is controlled by the hydraulic pressure timer 146 controlled by the second and third solenoid-operated valves 142, 143 (i.e., the plunger lift and its speed Vp shown in FIG. 39 are adjusted from the retarded side indicated by the solid lines to the advanced side indicated by the two-dot-and-dash lines). Therefore, the fuel feed ratio ($\Delta q/\Delta t$), the injection timing T, and the injection ratio can freely be set to optimum values in various engine speed ranges and load ranges. As a result, the noise produced during idling can be reduced, and the engine output power can be increased in the low speed, high load range. In the high speed, low load range, fuel is injected at a low injection ratio ($\Delta q/\Delta t$) to prevent excessive fuel injection for increasing the durability of the fuel injection mechanism and the engine, so that the vibration and noise due to the engine rotation can be lowered.

Since the fuel injection system can dispense with a spill ring operated by an accelerator link system having a governor, it may be small in size.

The fuel feed ratio ($\Delta q/\Delta t$), the injection advance T, and the injection rate can accurately be adjusted for increased response thereof when they are controlled by turning on and off the solenoid-operated valve.

A fuel injection system according to an eighth embodiment of the present invention will now be described below with reference to FIGS. 42 and 43.

Figure 42:
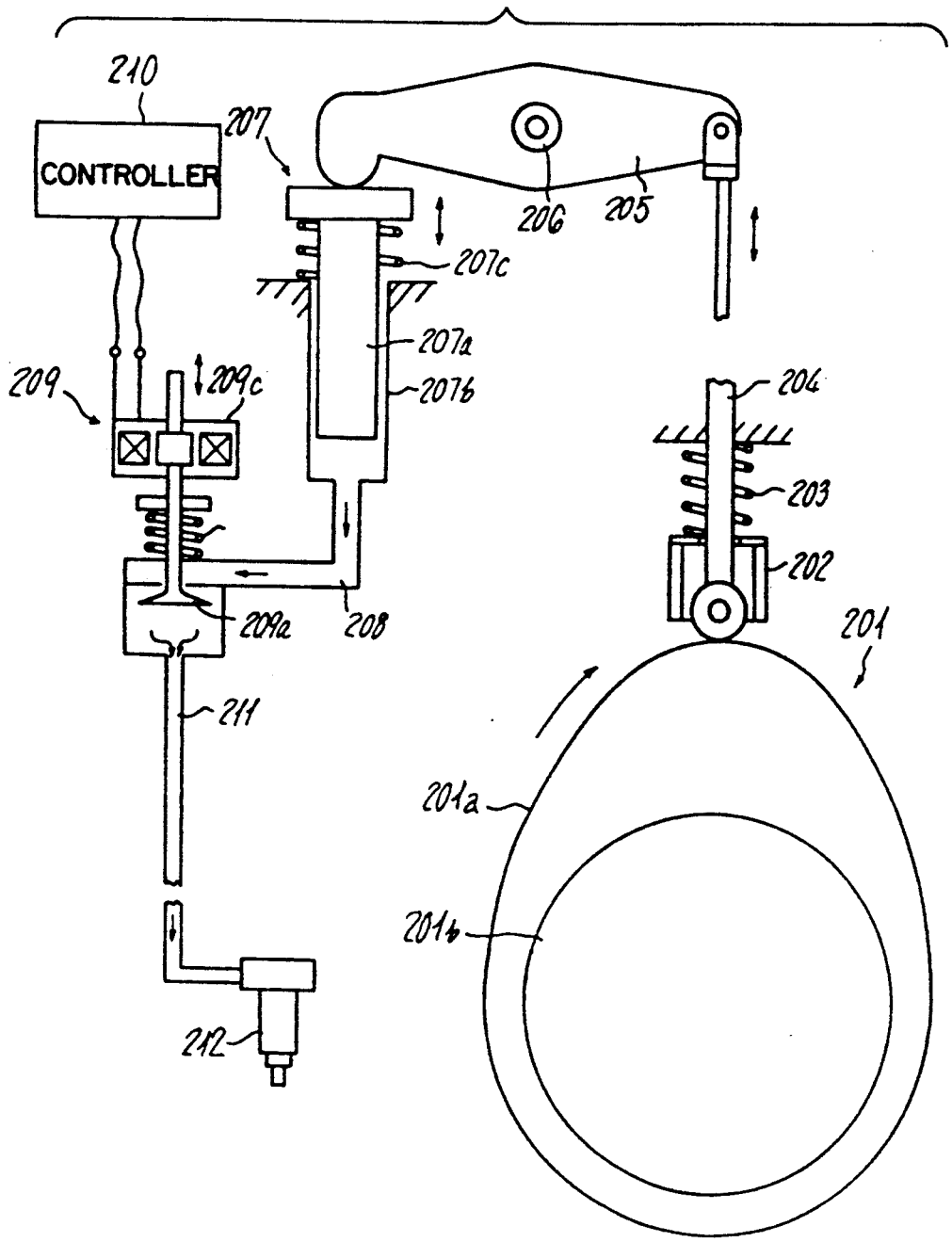

As shown in FIG. 42, a cam 201a is mounted on a camshaft 201b that is rotatable in response to rotation of a crankshaft.

A pump 207 feeds fuel to an injection nozzle. The pump 207 comprises a plunger 207a, a cylinder 207b, and a spring 207c for normally urging the plunger 207a in a direction out of the cylinder 207b. A roller tappet 202 is mounted on one end of a push rod 204, and is normally urged into abutment against the cam 201a under the bias of a spring 203. The other end of the push rod 204 is pivotally attached to one end of a rocker arm 205 that is swingable about a rocker shaft 206. The other end of the rocker arm 205 is held against an outer end of the plunger 207a. The pump 207 is connected to a solenoid-operated valve 209 by a fuel passage 208. The solenoid-operated valve 209 comprises a valve 209a, a spring 209b for normally urging the valve 209a in a direction to close the valve 209a, and a solenoid 209c for opening the valve 209a. The solenoid 209c is electrically connected to a controller 210 which outputs a signal to determine a timing to open the valve 209a.

The speed at which the plunger 207a moves is determined by the cam profile of the cam 201 and the rotational speed of the crankshaft.

The solenoid-operated valve 209 and the controller 210 jointly serve as a fuel control means.

As indicated by the solid-line curve 217 in FIG. 43(b), insofar as the rotational speed of the engine is constant, the speed of movement of the plunger 207a and the crankshaft angle should be related to each other such that the speed of movement of the plunger 207a increases at a constant rate, and then becomes constant at a crankshaft angle before its maximum speed is reached and remains constant in a crankshaft angle range in which a pilot injection is effected, and that after the speed of movement of the plunger 207a has reached the maximum speed, it is reduced at a constant negative acceleration. To meet such a requirement, it is necessary that the cam profile and the crankshaft angle be related to each other as indicated by a quadratic curve 218 including a linear portion as shown in FIG. 43(c) (the quadratic curve 218 varies when the dynamic model shown in FIG. 42 varies). Injection ratios for respective late and early fuel injection timings are indicated by upper solid-line curves 213, 214 and lower broken-line curves 215, 216 in FIG. 43(a). If the above relationship between the cam profile and the crankshaft angle is employed, then the injection ratio for the main injection varies as the plunger speed varies, but the injection ratio for the pilot injection does not vary as the plunger speed remains unchanged.

INDUSTRIAL APPLICABILITY

The fuel injection system according to the present invention can effectively be employed to obtain optimum fuel combustion in a diesel engine, and can particularly establish combustion characteristics depending on the engine speed and load. The fuel injection system is highly effective to meet demands for minimizing noise and harmful components in exhaust gases.

We claim:

1. A fuel injection system comprising:
   a fuel pump having a plunger slidably disposed in a plunger chamber defined in a housing and operatively coupled to a cam actuatable by an engine, said fuel tank including a pressure chamber defined in said housing, for pressurizing fuel supplied from a fuel tank with said plunger;
   a fuel injection nozzle for being supplied with said fuel from said pressure chamber; and
   fuel control means for controlling the pressure of the fuel between said pressure chamber and said fuel injection nozzle, said fuel control means including a solenoid-operated valve for selectively connecting and disconnecting said pressure chamber and said fuel injection nozzle, and a controller, responsive to control signals indicative of the rotational speed of the engine and the load on the engine, for applying a drive signal to said solenoid-operated valve at a predetermined time within a pressurizing stroke of said plunger and for controlling said solenoid-operated valve to inject fuel at a low rate in a pilot injection prior to a main injection.

2. A fuel injection system according to claim 1, wherein said fuel injection pump comprises an in-line fuel injection pump in which said plunger is reciprocally movable in said plunger chamber by said cam.

3. A fuel injection system according to claim 2, wherein said controller includes an injection advance map for establishing an injection advance depending on said rotational speed and said load, and an injection period map for establishing an injection timing and an injection period depending on said rotational speed and said load, said controller including means for actuating said solenoid-operated valve to achieve the injection advance, the injection timing, and the injection period that are established by said maps depending on said rotational speed and said load.

4. A fuel injection system according to claim 2, wherein said controller includes an injection advance map for establishing an injection advance depending on said rotational speed and said load, and an injection period map for establishing an injection timing and an injection period depending on said rotational speed and said load, said fuel control means including an eccentric-cam timer disposed between a drive shaft of the engine and a driven shaft for driving said cam, and an actuator for actuating said eccentric-cam timer, and said controller including means for operating said actuator to achieve the injection advance that is established by said injection advance map depending on said rotational speed and said load, and for actuating said solenoid-operated valve to achieve the injection timing and the injection period that are established by said injection period map depending on said rotational speed and said load.

5. A fuel injection system according to claim 3, wherein said injection advance map is arranged such that the injection advance is increased as said rotational speed increases from a low speed, high load range toward a high speed, low load range.

6. A fuel injection system according to claim 4, wherein said injection advance map is arranged such that the injection advance is increased as said rotational speed increases from a low speed, high load range toward a high speed, low load range.

7. A fuel injection system according to claim 3, wherein said injection period map is arranged such that the injection period is longer to increase an injection rate as said load is higher.

8. A fuel injection system according to claim 4, wherein said injection period map is arranged such that the injection period is longer as said load is higher.

9. A fuel injection system according to claim 1, wherein said plunger has a cylindrical shape.

10. A fuel injection system according to claim 1, wherein said solenoid-operated valve comprises a normally open solenoid-operated valve for normally keeping said pressure chamber and said fuel tank connected to each other.

11. A fuel injection system according to claim 1, wherein said solenoid-operated valve is connected to a joint portion of an injection pipe by which said fuel pump and said fuel injection nozzle, said fuel pump and said joint portion being spaced by from each other along said injection pipe a distance 1, said joint portion and said fuel injection nozzle being spaced from each other by a distance 2 along said injection pipe, said distances satisfying the relationship: $1 > 2$.

12. A fuel injection system according to claim 1, wherein said cam has a cam profile for moving said plunger at a constant speed during said pilot injection irrespective of whether the injection of the fuel is advanced or retarded.

13. A fuel injection system according to claim 1, wherein said cam is rotatable at the same speed as that of the engine, said solenoid-operated valve being arranged to connect said pressure chamber and said fuel injection nozzle to each other once while said cam is making two revolutions, for injecting fuel from said fuel injection nozzle.

14. A fuel injection system according to claim 13, wherein said fuel control means comprises an actuating member movable with said cam, and a cam sensor positioned in the path of said actuating member, for applying a signal to said controller, said controller comprising means for controlling said solenoid-operated valve in response to said signal from said cam sensor.

15. A fuel injection system according to claim 14, wherein said fuel control means includes a directional control valve disposed between said solenoid-operated valve and said fuel injection nozzle, and has an outlet connected to as many fuel injection nozzles as the number of cylinders of the engine, and a direction switching member connected to said directional control valve, for detecting a rotational phase when the rotational speed of said cam is a multiple commensurate with the number of fuel injection nozzles, said directional control valve being shiftable, in response to the rotational phase detected by said direction switching member, for supplying fuel to the fuel injection nozzle which is associated with the cylinder in a compression stroke.

16. A fuel injection system according to claim 1, wherein said fuel pump includes a distributor fuel injection pump in which said plunger is reciprocally and rotatably movable in said plunger chamber by said cam which is held in rolling contact with rollers supported in said housing.

17. A fuel injection system according to claim 16, wherein said controller includes an injection advance map for establishing an injection advance depending on said rotational speed and said load, and an injection period map for establishing an injection timing and an injection period depending on said rotational speed and said load, said controller including means for actuating said solenoid-operated valve depending on said rotational speed and said load.

18. A fuel injection system according to claim 16, wherein said controller includes an injection advance map for establishing an injection advance depending on said rotational speed and said load, and an injection period map for establishing an injection timing and an injection period depending on said rotational speed and said load, said fuel control means including an actuator for rotating a support of said rollers with respect to said housing, said controller including means for operating said actuator to achieve the injection advance that is established by said injection advance map depending on said rotational speed and said load, and for actuating said said solenoid-operated valve to achieve the injection timing and the injection period that are established by said injection period map depending on said rotational speed and said load.

19. A fuel injection system according to claim 17, wherein said injection advance map is arranged such that the injection advance is increased as said rotational speed increases from a low speed, high load range toward a high speed, low load range.

20. A fuel injection system according to claim 18, wherein said injection advance map is arranged such that the injection advance is increased as said rotational speed increases from a low speed, high load range toward a high speed, low load range.

21. A fuel injection system according to claim 17, wherein said injection period map is arranged such that the injection period is longer to increase an injection rate as said load is higher.

22. A fuel injection system according to claim 18, wherein said injection period map is arranged such that the injection period is longer to increase an injection rate as said load is higher.

23. A fuel injection system according to claim 1, wherein said plunger of said fuel pump is actuatable by said cam through a rocker arm and a push rod.

24. A fuel injection system according to claim 23, wherein said controller includes an injection advance map for establishing an injection advance depending on said rotational speed and said load, and an injection period map for establishing an injection timing and an injection period depending on said rotational speed and said load, said controller including means for actuating said solenoid-operated valve to achieve the injection advance, the injection timing, and the injection period that are established by said maps depending on said rotational speed and said load.

25. In a fuel injection system including: a fuel pump having a plunger slidably disposed in a plunger chamber defined in a housing and operatively coupled to a cam actuatable by an engine, the fuel tank also having a pressure chamber defined in the housing, for pressurizing fuel supplied from the fuel tank with the plunger; a fuel injection nozzle for being supplied wit the fuel from the pressure chamber; and fuel control device for controlling the pressure of the fuel between said pressure chamber and said fuel injection nozzle, a method of fuel injection control comprising the steps of:
   selectively connecting and disconnecting the pressure chamber and the fuel injection nozzle by operating a solenoid-operative valve;
   applying a drive signal to the solenoid-operated valve at a predetermined time within a pressurizing stroke of the plunger, responsive to control signals indicative of the rotational speed of the engine and the load on the engine; and
   controlling the solenoid-operated valve to inject fuel at a low rate in a pilot injection prior to a main injection.

26. The method of claim 25 further comprising the steps of:
   establishing an injection advance depending on the rotational speed and the load;
   establishing an injection timing and an injection period depending on the rotational speed and the load; and
   actuating the solenoid-operated valve to achieve the injection advance, the injection timing, and the injection period that are established by said establishing steps depending on the rotational speed and the load.

27. The method of claim 26, wherein said step of establishing an injection advance includes increasing the injection advance as the rotational speed increases from a low speed, high load range toward a high speed, low load range.

28. The method of claim 26, wherein said step of establishing an injection period includes making the injection period longer to increase an injection rate as the load is higher.

29. The method of claim 27, wherein said step of establishing an injection period includes making the injection period longer as the load is higher.

* * * * *